US009568752B2

United States Patent
Ho et al.

(10) Patent No.: US 9,568,752 B2
(45) Date of Patent: Feb. 14, 2017

(54) ORGANIC ELECTRO-OPTIC MODULATORS WITH TRANSPARENT CONDUCTING ELECTRODES AND RELATED DEVICE STRUCTURES

(71) Applicant: Northwestern University, Evanston, IL (US)

(72) Inventors: Seng-Tiong Ho, Wheeling, IL (US); Fei Yi, Evanston, IL (US); Tobin J. Marks, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 15/018,361

(22) Filed: Feb. 8, 2016

(65) Prior Publication Data

US 2016/0170244 A1    Jun. 16, 2016

Related U.S. Application Data

(62) Division of application No. 14/171,296, filed on Feb. 3, 2014, now Pat. No. 9,256,086, which is a division of application No. 12/582,518, filed on Oct. 20, 2009, now Pat. No. 8,644,648.

(60) Provisional application No. 61/106,838, filed on Oct. 20, 2008.

(51) Int. Cl.
| | | |
|---|---|---|
| G02F 1/035 | (2006.01) | |
| G02B 6/12 | (2006.01) | |
| G02F 1/065 | (2006.01) | |
| G02F 1/225 | (2006.01) | |
| G02F 1/00 | (2006.01) | |

(52) U.S. Cl.
CPC ............ *G02F 1/065* (2013.01); *G02F 1/0018* (2013.01); *G02F 1/2255* (2013.01); *G02F 2201/122* (2013.01); *G02F 2202/02* (2013.01)

(58) Field of Classification Search
CPC .................................. G02B 6/12; G02F 1/065
USPC ...................................................... 385/2, 14
See application file for complete search history.

(56) References Cited

U.S. PATENT DOCUMENTS

| | | |
|---|---|---|
| 5,044,712 A | 9/1991 | Soref |
| 5,781,670 A | 7/1998 | Deacon et al. |
| 5,943,464 A | 8/1999 | Khodja |
| 6,025,864 A | 2/2000 | Nashimoto |
| 6,041,071 A | 3/2000 | Tayebati |
| 6,470,125 B1 | 10/2002 | Nashimoto et al. |
| 6,522,794 B1 | 2/2003 | Bischel et al. |
| 7,408,693 B2 | 8/2008 | Kissa et al. |
| 7,720,116 B2 | 5/2010 | Anderson et al. |
| 7,860,358 B2 | 12/2010 | Tsuda et al. |
| 2002/0093995 A1 | 7/2002 | Tayebati |
| 2002/0131465 A1 | 9/2002 | Lo et al. |
| 2002/0136259 A1 | 9/2002 | Evans et al. |
| 2003/0142895 A1 | 7/2003 | Bond et al. |

(Continued)

OTHER PUBLICATIONS

Shi Y; Lin W; Olson DJ; Bechtel JH; Zhang H; Steier WH; Zhang C; Dalton LR. Electro-optic polymer modulators with 0.8 V half-wave voltage. Applied Physics Letters, vol. 77, No. 1, Jul. 3, 2000, pp. 1-3.

(Continued)

*Primary Examiner* — Kaveh C Kianni
(74) *Attorney, Agent, or Firm* — Reinhart Boerner Van Deuren s.c.

(57) ABSTRACT

Electro-optic (EO) modulator and related device structures which can be used in conjunction with high EO materials to lower switching voltage and improve related performance parameters.

11 Claims, 23 Drawing Sheets

(56) References Cited

U.S. PATENT DOCUMENTS

| | | |
|---|---|---|
| 2003/0161022 A1 | 8/2003 | Lazarev et al. |
| 2003/0223668 A1 | 12/2003 | Breukelaar et al. |
| 2005/0265403 A1 | 12/2005 | Anderson et al. |
| 2006/0203328 A1 | 9/2006 | Lazarev et al. |
| 2006/0227823 A1 | 10/2006 | Mohammed et al. |
| 2008/0069491 A1 | 3/2008 | Kissa et al. |
| 2008/0099698 A1 | 5/2008 | Rahman et al. |
| 2009/0017455 A1 | 1/2009 | Kwong et al. |
| 2009/0214161 A1 | 8/2009 | Tsuda et al. |
| 2009/0310903 A1 | 12/2009 | Nakada et al. |
| 2010/0119192 A1 | 5/2010 | Fujikata et al. |

OTHER PUBLICATIONS

Enami Y; Derose CT; Loychik C; Mathine D; Norwood RA; Luo J; Jen A K-Y; Peyghambarian N. Low half-wave voltage and high electro-optic effect in hybrid polymer/sol-gel waveguide modulators. Applied Physics Letters 89, 143506 (2006).

Cheng Y-J; Luo J; Huang S; Zhou X; Shi Z; Kim T-D; Bale DH; Takahashi S; Yick A; Polishak BM; Jang S-H; Dalton LR; Reid PJ; Steier WH; Jen A K-Y. Donor-Acceptor Thiolated Polyenic Chromophores Exhibiting Large Optical Nonlinearity and Excellent Photostability. Chem. Mater. 2008, 20, pp. 5047-5054.

Dalton LR; Steier WH; Robinson BH; Zhang C; Rena; Garners; Chen A; Londergan T; Irwin L; Carlson B; Fifield L; Phelan G; Kincaid C; Amend J; Jen A. From molecules to opto-chips: organic electro-optic materials. J. Mater. Chem., 1999, 9, pp. 1905-1920.

Freeman AJ; Poeppelmeier KR; Mason TO; Chang RPH; Marks T J. Chemical and Thin-Film Strategies for New Transparent Conducting Oxides. MRS Bulletin, Aug. 2000, pp. 45-51.

Wang L; Yoon, M-H; Lug; Yang Y; Facchetti A; Marks T J. High-performance transparent inorganic-organic hybrid thin-film n-type transistors. Nature Materials, vol. 5, Nov. 2006, pp. 893-900.

Enami Y; Derose CT; Mathine D; Loychik C; Greenlee C; Norwood RA; Kim TD; Luo J. Tian Y; Jen A K-Y; Peyghambarian N. Hybrid polymer/sol-gel waveguide modulators with exceptionally large electro-optic coefficients. Nature Photonics, vol. 1, Mar. 2007, pp. 180-185.

Dinu R; Jin D; Huang D; Koenig MK; Barklund AM; Fang Y; Parker, TC; Shi Z; Luo J; Jen A K-Y. Low-Voltage Electro-optic Polymer Modulators. Proc. of SPIE, vol. 6243 62430-G-1 through G-8, (2006).

Soref, RA; Lorenzo JP. All-Silicon Active and Passive Guided-Wave Components for $\lambda=1.3$ and 1.6 1-1m. IEEE Journal of Quantum Electronics, vol. QE-22, No. 6, Jun. 1986, pp. 873-879.

U.S. Appl. No. 14/171,296, filed Feb. 3, 2014.

U.S. Appl. No. 12/582,518, filed Oct. 20, 2009.

(a)

(b)

(a)

(b)

(c)

(a)

(b)

(a)

(b)

(a)

(b)

(c)

(a)

(b)

(c)

(d)

(a)

(b)

(c)

(a)

(b)

(c)

(a)

(b)

(c)

(d)

(e)

ORGANIC ELECTRO-OPTIC MODULATORS WITH TRANSPARENT CONDUCTING ELECTRODES AND RELATED DEVICE STRUCTURES

This application is a divisional of and claims priority to and the benefit of application Ser. No. 14/171,296 filed Feb. 3, 2014 and issued as U.S. Pat. No. 9,256,086 on Feb. 9, 2016 which was a divisional of and claimed priority to and the benefit of application Ser. No. 12/582,518 filed Oct. 20, 2009 and issued as U.S. Pat. No. 8,644,648 on Feb. 4, 2014, and application Ser. No. 61/106,838 filed Oct. 20, 2008—each of which is incorporated herein by reference in its entirety.

This invention was made with government support under N00014-04-1-0093 awarded by the Office of Naval Research and DMR-0076097 awarded by the National Science Foundation. The government has certain rights in the invention.

BACKGROUND OF THE INVENTION

An electro-optic (EO) optical intensity modulator is often used when one needs to convert electrical signals to optical signals. This can be achieved by using the modulator to turn on and off the optical power from a continuous-wave (CW) laser beam passing through the modulator. Optical intensity modulators are thus used widely in optical fiber communications to modulate light from semiconductor lasers to produce the required optical pulses carrying digital data for transmission through optical fibers. At data rates below 2.5 Gigabits per second (Gbits/sec), it is much more convenient to simply directly modulate the injection current of the semiconductor laser to produce the required optical pulses. However, direct current modulation can produce frequency chirping (change in the lasing frequency at the leading and trailing edges of the pulse) caused by the carrier-induced modulation of the laser material's refractive index and hence, the resonant frequency of the laser cavity. At high modulation rates (above 10 Gbits/sec), a frequency chirped pulse will be rapidly broadened in width after propagating through a long length of optical fiber due to the fiber's group velocity dispersion, causing serious degradation in the signal integrity. Thus, external optical intensity modulators are needed for long-distance optical communications at bit rates at or above 10 Gbits/sec.

Current commercially-available high-speed EO optical intensity modulators are based on lithium niobate crystals ($LiNbO_3$). These modulators typically have on/off switching voltages (also called half-wave voltage or $\pi$-phase-shift voltage, $V_\pi$) of ~5 V and electrical terminal impedance Z of ~50Ω. (B. Kuhlow, "Modulators", in *Laser Fundamentals. Part* 2, Springer Berlin Heidelbert, 2006.) This means that the electrical power required to drive the modulator given by $P=V_\pi^2/Z$ will be about 0.5 W, which is high and quite inefficient in terms of electrical-to-optical signal-power conversion, considering that typical semiconductor laser powers emitted into optical fibers is less than 10 mW. Since electrical power is proportional to the voltage squared, there is much interest in reducing the driving voltage of the modulator. For example, a 0.5 V modulation voltage will reduce the drive power to 5 mW, making it closer to achieving a one-to-one electrical-to-optical signal-power conversion when used with a typical semiconductor laser emitting 1-10 mW power into an optical fiber.

Based on the capability of modulating the light intensity in optical fibers with analog high-frequency signals by using EO modulators, there has been much recent interest in using optical fibers to transmit analog radio-frequency (RF) electrical signals by first intensity modulating a laser beam with the RF signals and then recovering the RF signals with a photodetector that converts optical power back to electrical voltage. This area of pursuit is referred to as RF Photonics. The interest in RF Photonics arises because the traditional way to transmit RF signals is with use of a metallic RF transmission line (or coax cable), which can become quite lossy at frequencies above 10 GHz due to skin-depth effects (electrical current confinement to a thin layer at the metal surface) that becomes more serious at higher frequencies. High-frequency metallic transmission lines are also costly and heavy in weight. For reasons similar to those discussed above, in order for an RF signal of power $P_{RF}$ to be transmitted through an optical fiber and be converted back to an RF signal of power $\sim P_{RF}$ at the photodetector, without adding significant excess noise (i.e., in order to realize a near-lossless and low-noise RF signal transmission with near-unity noise figure), EO intensity modulators with $V_\pi$ less than 0.5V are required (when used with a typical 1-10 mW semiconductor laser). Otherwise, semiconductor lasers and detectors designed for significantly higher optical powers (e.g. 100 mW-1 W) would be required, resulting in significantly higher total electrical power consumption and higher cost. Such high-speed low-voltage modulators are difficult to realize using $LiNbO_3$ due to its relatively low electro-optic coefficient.

Recently, it has been shown that organic EO materials can be engineered to have high EO coefficients (>5× than $LiNbO_3$), leading to alternatives for new sub-1-Volt organic EO modulators (for 2-cm long devices). (See, e.g., L. R. Dalton, et al., From molecules to opto-chips: organic electro-optic materials, *J. Mater. Chem.* 9, 1905-1920, 1999; Y. Shi, et al., Electro-optic polymer modulators with 0.8 V half-wave voltage, *Appl. Phys. Lett.* 77, 1-3, 2000; Y. Enami, et al., Low half-wave voltage and high electro-optic effect in hybrid polymer/sol-gel waveguide modulators, *Appl. Phys. Lett.*, 89, 143506, 2006; Y. Enami, et al., Hybrid polymer/sol-gel waveguide modulators with exceptionally large electro-optic coefficients, *Nature Photonics*, 1, 180-185, 2007, each of which is incorporated herein by reference in its entirety.) However, current modulator designs and component materials tend to limit further advances in performance. As such, it remains an ongoing concern in the art to develop new modulator structures to better utilize the benefits and advantages available through use of such EO materials-such modulators as can enable RF photonics and next-generation higher-bit-rate optical fiber communication systems.

SUMMARY OF THE INVENTION

In light of the foregoing, it is an object of the present invention to provide electro-optic modulators and related device structures, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide a modulator design, with related component configurations, to better utilize new organic electro-optic materials with exceptionally high EO coefficients.

It can be another object of the present invention to utilize transparent conducting oxide electrode bridge components, with appropriate electrical and optical characteristics, in conjunction with such a modulator design—to lower switching power and compact device structure.

Other objects, features, benefits and advantages of the present invention will be apparent from the following and descriptions of certain embodiments, and will be readily apparent to those skilled in the art having knowledge of various electro-optic modulators, waveguides, and related device structures. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to an EO modulator device comprising a side-conduction geometry. Without limitation, such a device can comprise an optical waveguide component comprising an organic core component with cladding thereabout and optically coupled thereto, such an organic core component as can be connected to opposed electrode components, each such connection as can be made with a laterally-extending transparent conducting oxide electrode bridge component, as can apply switching voltage directly across such a core component, such cladding as can consist of bottom and lateral components, with respect to such a core component.

In certain such embodiments, a portion of such a bottom cladding component can be recessed and configured to provide lateral cladding components, with such a core component positioned in such a configured recess. Without limitation, such a device can be as illustrated herein and discussed more fully below; however, as would be understood by those skilled in the art, various other device and component configurations are envisioned and can be designed with a side-conduction geometry and consideration of factors of the sort discussed herein. In certain other embodiments, such a device can comprise opposed electrodes co-planar with such a core component and lateral cladding components. Without limitation, such a device can be as illustrated herein and discussed more fully below; however, as would be understood by those skilled in the art, various other device and component configurations are envisioned and can be designed with a side-conduction geometry and consideration of factors of the sort discussed herein. Regardless, such a device can be incorporated into a system with a transmission line comprising each such electrode.

In part, the present invention can also be directed to an EO modulator device as can comprise an optical waveguide component comprising an organic core component with cladding thereabout and optically coupled thereto, such an organic core component as can be connected to opposed co-planar metallic electrodes, each such connection as can be made with one of a pair of parallel laterally-extending transparent conducting oxide electrode bridge components, as can apply switching voltage directly across such a core component, such cladding as can consist of bottom and lateral components, with respect to such a core component.

In certain such embodiments, such a modulator device can be incorporated into a system with a transmission line comprising each such electrode. In certain such embodiments, such transmission lines can have a co-planar transmission line geometry. Regardless, such transmission lines can be incorporated into an RF transmission system.

As such, in part, the present invention can also be directed to an RF transmission system. Such a transmission system can comprise a side-conduction EO modulator device comprising an optical waveguide component comprising an organic core component with cladding thereabout and optically coupled thereto, such a core component as can comprise a material providing modulation at a frequency by an RF signal, such an organic core component as can be connected to opposed electrode components, each such connection as can be made with a laterally-extending transparent conducting oxide electrode bridge component, as can apply switching voltage directly across such a core component, such cladding as can consist of bottom and lateral components, with respect to such a core component.

In certain such embodiments, a portion of such a bottom cladding component can be recessed and configured to provide lateral cladding components, with such a core component positioned in such a configured recess. Without limitation, such a system and modulator device can be as illustrated herein and discussed more fully below; however, as would be understood by those skilled in the art, various other system, device and component configurations are envisioned and can be designed with a side-conduction geometry and consideration of factors of the sort discussed herein. In certain other embodiments, such a device can comprise opposed electrodes co-planar with such a core component and lateral cladding components. Without limitation, such a system and modulator device can be as illustrated herein and discussed more fully below; however, as would be understood by those skilled in the art, various other system, device and component configurations are envisioned and can be designed with a side-conduction geometry and consideration of factors of the sort discussed herein.

As mentioned above, recently developed organic EO materials with exceptionally high EO coefficients offer promising alternatives to conventional $LiNbO_3$ for next-generation EO modulators. However, the great potential of these materials has not been fully realized because of the high voltage drop across the thick cladding layers required in conventional modulator designs. In accordance with various embodiments thereof, this invention can be directed to new modulator and related device structures, utilizing transparent conducting oxide (TCO) electrodes with appropriate electrical and optical loss characteristics, such modulators as can dramatically lower required switching power and enable compact device structures. Without limitation, but representative of the benefits and advantages of this invention, an indium oxide-based phase modulator using a high-$r_{33}$ polymer can achieve a power-length product equivalent to only 7.2 mW-$cm^2$—about 100-fold lower than that of current organic EO modulator designs.

DETAILED DESCRIPTION OF CERTAIN EMBODIMENTS

Figure 1A:
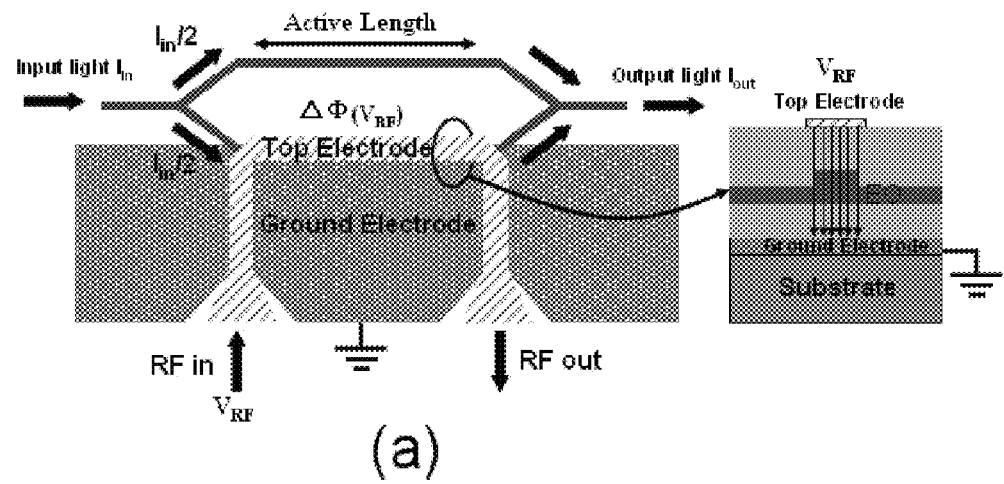
FIGS. 1A-B. Mach Zehnder Interferometer (MZI) geometry for an EO intensity modulator: input light energy is split into two halves by a Y-junction, and each half attains a different optical phase shift through electro-optic modulation. These beams are recombined through another Y-junction at the output waveguide. Two designs are possible: (A) A Single-Arm MZI design for which optical beam in only one of the two arms is phase modulated, and (B) A Push-Pull MZI design in which optical beams in the two arms experience opposite phase modulations.
Figure 1B:
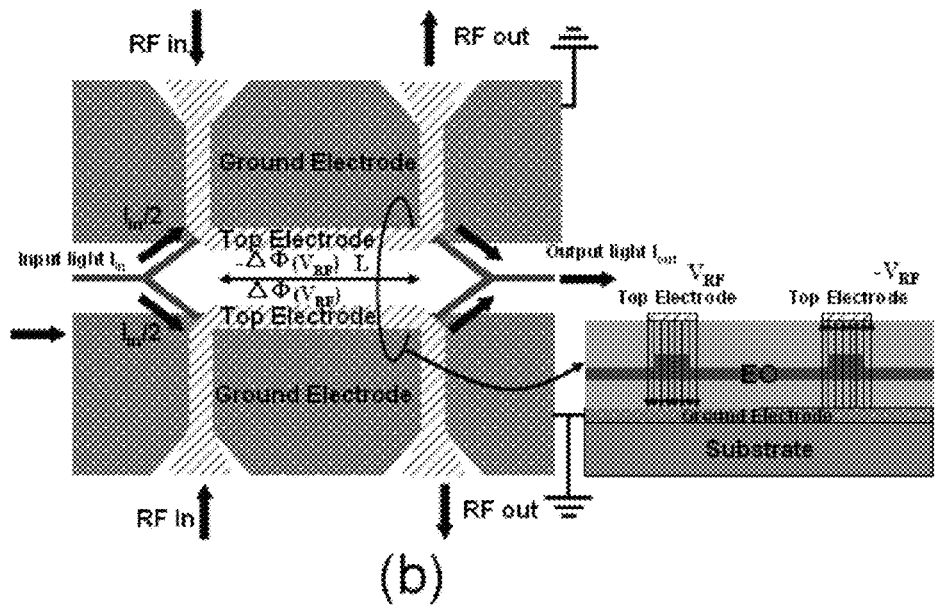

As can relate to certain embodiments of this invention, or as can be considered for purpose of comparison with the prior art, an electro-optic material has the property that the refractive index can be altered under an applied electric field, resulting in an optical phase shift for a laser beam propagating through the material. The intrinsic material response is generally electronic in nature and can be fast (100 GHz or faster), which enables the refractive index to be modulated at high frequencies by an RF signal. The optical phase shift can be converted to an intensity change using a Mach Zehnder interferometer (MZI), which has a typical waveguide geometry shown in FIG. 1 in which an input laser beam is split into two waveguide arms by a Y-junction waveguide, forming an input 50/50 beam splitter. One arm of the MZI contains the EO material while the other arm has no EO material. The beams from the two arms are then recombined using another Y-junction waveguide that merges the beams into an output waveguide. The optical path lengths going through the two arms are made equal so that the two beams will interfere constructively at the output Y-junction and transfer all the power into the output waveguide. An applied voltage on the EO arm causing a π phase shift changes the constructive interference to a destructive interference, resulting in no light going into the output waveguide (it will be dispersed to the side areas outside the waveguide). This π-phase-shift voltage is referred to as $V_\pi$. In an alternative "push-pull" geometry, both arms have electro-optic materials with applied voltages, however the voltages are applied in such a way that the phase shifts in the two arms are equal and opposite in direction. In this case, to turn the light power in the output waveguide to off requires an applied voltage of $V_\pi/2$, which is half the $V_\pi$ value. This is termed a push-pull MZI modulator geometry.

Figure 2:
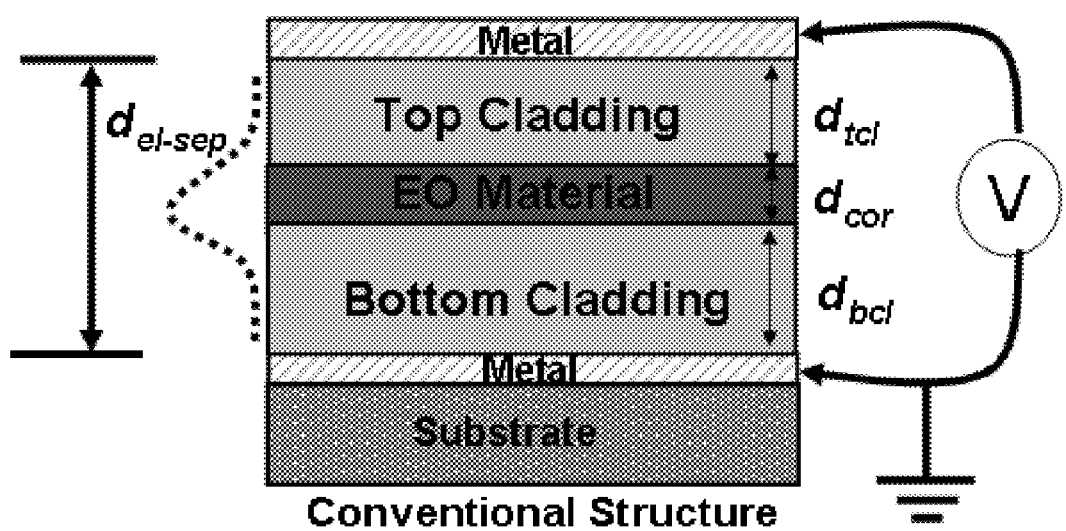
FIG. 2. Conventional organic EO modulator structure using metal electrodes.

The $V_\pi$ achieved depends on the EO coefficient of the EO material as well as the actual device geometry with respect to the electrodes and the vertical and horizontal optical mode confinement structures. The typical cross-section of a conventional organic modulator structure is shown in FIG. 2 in which the optical mode propagates in the center waveguide core with refractive index $n_{cor}$ and thickness $d_{cor}$. The waveguide core is surrounded above and below by a top cladding with refractive index $n_{tcl}$ and a bottom cladding with refractive index $n_{bcl}$, for which $n_{tcl}$ and $n_{bcl}$ are lower than $n_{cor}$. The thicknesses of the top and bottom claddings are $d_{tcl}$ and $d_{bcl}$, respectively. The waveguide core is filled with an organic EO material. An electric field is applied to the EO material through a top metal electrode ($M_t$) and a bottom metal electrode ($M_b$) above and below the top and bottom claddings, respectively. The net separation between the two electrodes is given by $d_{el-sep}=d_{cor}+d_{tcl}+d_{bcl}$. For an EO material with EO coefficient r, refractive index n, the optical phase shift $\Delta\Phi$ induced by an applied electric field E is given by EQ(1).

$$\Delta\Phi = k_0 \Delta n L = \frac{\pi}{\lambda} n^3 r \Gamma_{EO} E L \qquad (1)$$

where L is the length that the optical beam propagates through the EO medium under the applied field (length of interaction), r is the EO coefficient relevant to the direction of the applied electric field (for organics, it is typically the coefficient $r_{33}$), and λ is the optical wavelength. (B. Kuhlow, "Modulators", in *Laser Fundamentals. Part 2*, Springer Berlin Heidelberg, 2006.) In the organic EO modulator described above, the electric field is related to the applied voltage via $E=V/d_{el-sep}$. In an actual waveguide structure, the optical beam may not have 100% overlap with the active EO material or the applied field may not be uniform across the EO material. This is taken into account of by the electro-optic mode-overlapping factor $\Gamma_{EO}$ in EQ(1). Solving for the π-phase-shift voltage, we obtain the following formula for the modulator $V_\pi$ (=$E \times d_{el-sep}$ at $\Delta\Phi=\pi$)

$$V_\pi = \frac{\lambda d_{el-sep}}{n^3 r \Gamma_{EO} L} \qquad (2)$$

Figure 3:
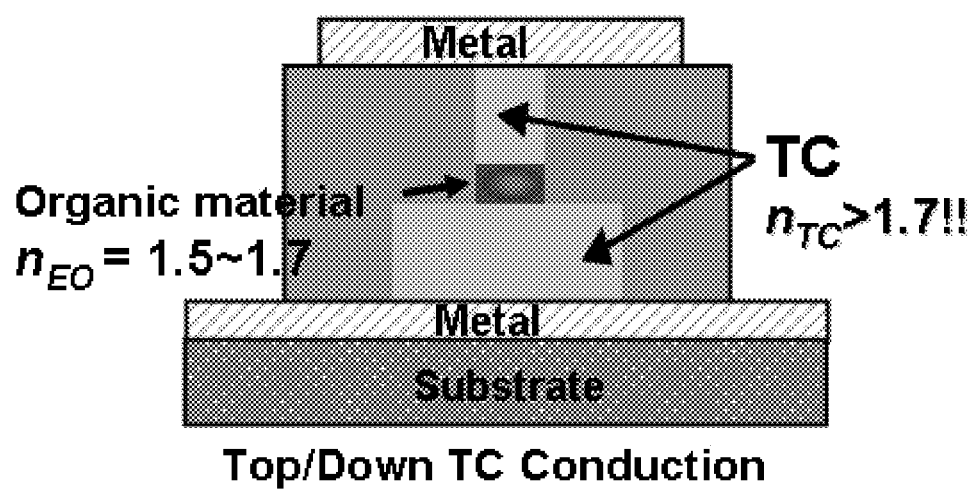
FIG. 3. For purpose of comparison, top/down conduction structure of a transparent conductor based organic EO modulator of the prior art. The two conductive cladding layers directly introduce the switching voltage from the metal electrode to the EO layer.

We see from EQ(2) that $V_\pi$ is also proportional to the electrode separation distance $d_{el-sep}$. For conventional polymer waveguide EO modulator structures, $d_{el-sep}$ is much larger than the EO layer thickness due to the existence of two thick cladding layers which are needed to separate the metal electrodes from the EO film to avoid metal induced optical loss, which means the switching voltage of the device is not fully driving the EO layer, but is wasted across the two thick cladding layers (i.e. $d_{el-sep}=d_{cor}+d_{tcl}+d_{bcl}$) as shown in FIG. 2. The conventional organic modulator structure for 1550 nm wavelength operation has $d_{el-sep}$ values ranging from 7.5 μm to 15 μm, with a typical value of about 12 μm, and the waveguide core thickness is typically about 1.5 μm. (See, e.g., Y. Shi, et al., Electro-optic polymer modulators with 0.8 V half-wave voltage, *Appl. Phys. Lett.* 77, 1-3, 2000; Y. Enami, et al., Low half-wave voltage and high electro-optic effect in hybrid polymer/sol-gel waveguide modulators, *Appl. Phys. Lett.*, 89, 143506, 2006; Y. Enami, et al., Hybrid polymer/sol-gel waveguide modulators with exceptionally large electro-optic coefficients, *Nature Photonics*, 1, 180-185, 2007, each of which is incorporated herein by reference in its entirety.) However, if the two cladding layers are both optically transparent and electrically conductive, they can introduce the switching voltage from the metal electrode directly to the EO layer and thus greatly reduce the modulation voltage. This is the basic concept behind the transparent conductor (TC) based organic EO modulator. One simple way to realize such TC-based EO modulator has been by replacing the top and bottom cladding with transparent conductors as illustrated in FIG. 3 (it turns out that this is not the preferred way as will be explained below), as "bridges" to conduct the voltage from the metal electrodes to the top and bottom parts of the EO material that forms the waveguide core, thereby reducing $d_{el-sep}$ from $d_{el-sep}=d_{cor}+d_{tcl}+d_{bcl}$ to $d_{el-sep}=d_{cor}$. The TC electrodes are also called the bridge electrodes. A common transparent conductor material is indium-tin oxide (Sn-doped $In_2O_3$, ITO) used widely in the electronic display industry. There are various metal oxides that are transparent conductors, which will be referred to as transparent conducting oxides (TCOs). ITO is a good TCO for visible light wavelengths, but not for the infrared (IR) wavelength range of 1550 nm due to its high optical absorption. Since modulators of interest for fiber-optic applications operate at 1550 nm, TCOs that have low optical absorption at 1550 nm are preferred. For such applications, metal oxides such as indium oxide ($In_2O_3$), zinc oxide (ZnO), cadmium oxide (CdO), etc are the preferred TCOs over ITO for the IR wavelength range.

In a TC-based organic EO modulator, $d_{el-sep}$ is equal to $d_{cor}$, which usually ranges from less than 0.9 μm to around 2 μm instead of the typical 12 μm $d_{el-sep}$ in a conventional EO modulator, resulting in a huge reduction of $V_\pi$ by 5 to 15×. However, as will be discussed in detail below, one often needs to trade off lower $V_\pi$ values for smaller electrical modulation bandwidths. Table 1 shows how different EO materials are required to achieve the desired $V_\pi L$ (voltage-length product) values based on (a) the conventional modulator structure and (b) a TC-based modulator structure. Note that the usual inorganic modulator such as $LiNbO_3$ modulator has r=30 pm/V and the usual, more-commonly available organic modulator material has r~10-30 pm/V. As depicted in Table 1, we see that the conventional modulators (employing a push-pull MZI configuration) typically result in a switching voltage $V_\pi/2$ of about 5 V for a 2 cm long device (assuming $d_{el-sep}$=12 μm). The use of transparent conductor offers a reduction in the voltage to less than 1 V for a 1 cm long device, even using an r=25 pm/V material. The more recently synthesize organic chromophoric materials with high EO coefficients of r=150-300 pm/V promise to either reduce the switching voltage $V_\pi/2$ to less than 0.1 V or to reduce a 1 V modulator length to 1 mm, making it far cheaper to manufacture and/or more easily to integrate with other devices.

TABLE 1

Comparison of the required EO coefficient for TCO electrodes and metal electrodes to achieve given $V_\pi L$ product under specific device conditions ($\lambda = 1.55$ µm, n = 1.7, d = 1.5 µm for transparent electrodes, $d_{el-sep} = 12$ µm for metal electrodes, $\Gamma_{EO} = 90\%$, push-pull structure).

| $V_\pi L$ | r for TC-based structure (assuming $d_{el-sep} = 1.5$ µm) | r for conventional structure ($d_{el-sep} = 12$ µm) |
|---|---|---|
| 5 V-cm | 5 pm/V | 40 pm/V |
| 1 V-cm | 25 pm/V | 200 pm/V |
| 0.5 V-cm | 50 pm/V | 400 pm/V |
| 0.25 V-cm | 100 pm/V | 800 pm/V |
| 0.1 V-cm | 250 pm/V | 2000 pm/V |

It is important to ensure that low modulator voltages can be achieved while still maintaining broad modulation bandwidths. There are a few common factors that can affect the modulation bandwidth of an EO modulator. From EQ (2), we see that $V_\pi$ is inversely proportional to the length of interaction, L. Given the device structure and EO material, in order to achieve a sufficiently low switching voltage of a few volts, L usually must be long. For LiNbO$_3$ devices, it is typically a few centimeters. Such a long L has consequences for the modulator frequency response. When the modulation frequency enters the radio frequency (RF) and microwave ranges (above 10 GHz), at which point the RF wavelength $\lambda_{RF}$ becomes smaller than L, (e.g., at 40 GHz, $\lambda_{RF}$ is only 5 mm) the modulation voltage along the electrodes will no longer be a uniform voltage but will behave like a travelling wave with a sinusoidally varying voltage pattern, and the electrodes must then be designed as an RF transmission line in order to efficiently propagate the modulation voltage applied at one end of the electrodes (at the end close to the optical input so that the RF wave can co-propagate with the optical beam energy). The transmission line then allows the RF modulation voltage to travel with the optical beam in the waveguide. In addition, due to higher metal conductor loss at high frequency, the amplitude of the RF travelling wave will decay along the transmission line. As a result, the switching voltage along the RF transmission-line electrodes will be given by:

$$V_{RF}(z,t) = V_{appl} e^{-\alpha_{RF} z} \cos(\omega_{RF} t - \beta z), \quad (3)$$

where $V_{appl}$ is the microwave source voltage applied at the starting point of the transmission line, $\alpha_{RF}$ is the radio-frequency wave decay constant, and $\beta$ is the RF wave propagation constant. The first factor $V_{appl} e^{-\alpha_{RF} z}$ means that the amplitude of the modulation voltage will decay along the transmission line exponentially, and its averaged amplitude ($V_{av}$) will be given by an integration over the modulator length L:

$$V_{av} = \frac{\int_0^L V_{appl} e^{-\alpha_{RF} z}}{L} = \frac{(1 - e^{-\alpha_{RF} L})}{\alpha_{RF} L} V_{appl} \Box r_{RFloss} V_{appl}, \quad (4)$$

Figure 4:
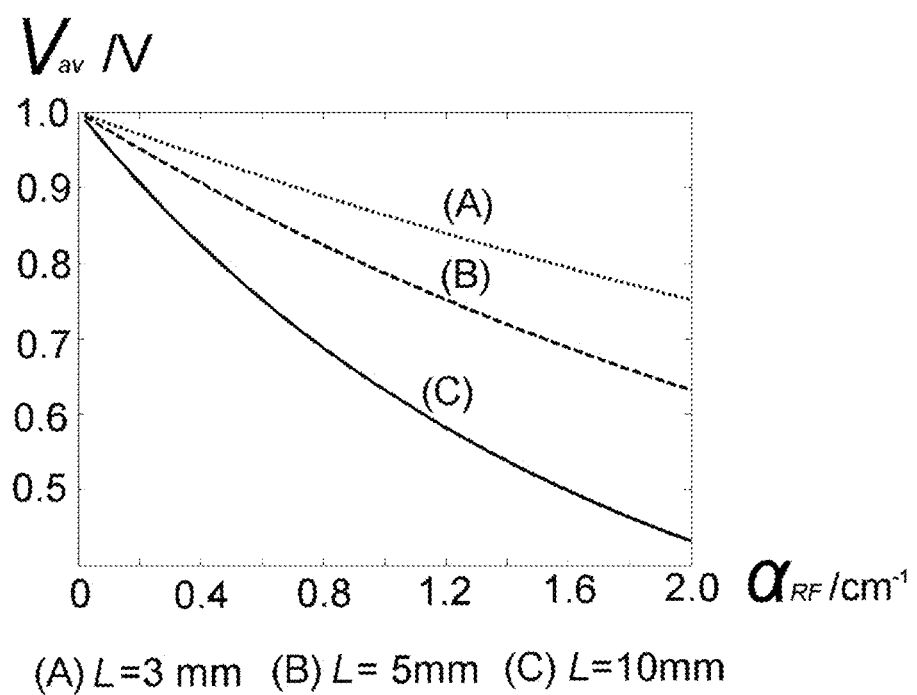
FIG. 4. Averaged amplitude $V_{av}$ of the switching voltage versus RF decay coefficient $\alpha_{RF}$ for different device lengths L, from 3 mm to 10 mm, assuming $V_{appl}=1V$.

FIG. 4 shows this averaged voltage $V_{av}$ versus $\alpha_{RF}$. Note that we have denoted the rate of $V_{av}$ over $V_{appl}$ as $r_{RFloss}$, so that $r_{RFloss} = 1$, or $V_{av} = V_{appl}$ indicates no voltage drop. When the decay $\alpha_{RF}$ is greater than 2/cm, the averaged amplitude of the switching voltage $V_\pi$ will be below 0.5 V for a 1 cm long device assuming $V_{appl} = 1$ V (i.e. less than half the applied voltage). In conventional metallic transmission lines, $\alpha_{RF}(f)$ is a function of frequency due to the skin depth effect of high frequency current in the metal as discussed above. Later we will see that in a TC-based structure, due to the finite conductivity and small thickness of the TC bridge electrodes, when the operation frequency f increases, $\alpha_{RF}(f)$ will increase to a significant value, and the averaged voltage $V_{av} = r_{RFloss} V_{appl}$ will then drop from the applied voltage $V_{appl}$ at the modulator RF input terminal, resulting in an important frequency cutoff factor.

Besides above voltage decay effect due to RF loss, another important effect is due to the difference between the propagation speed of the light pulse and the propagation speed of the RF travelling wave. The velocity at which an RF pulse travels along the transmission line is given by $v_{RF} = c/n_{RF}$, where $n_{RF}$ is the effective propagating refractive index of the transmission line, and c is the speed of light in vacuum. Similarly, the group velocity for the propagation of the optical energy in the waveguide is given by $v_{opt} = c/n_{gopt}$, where $n_{gopt}$ is the effective waveguide group-velocity refractive index for the propagating optical beam. Therefore, even if we assume $\alpha_{RF} = 0$, the amount of phase modulation experienced by the optical field still decays along z if $n_{RF}$ and $n_{gopt}$ are not equal. This is equivalent to a decrease in the effective modulation voltage. As a result, the effective voltage seen by the optical field traveling at velocity $v_{opt}$ at traveling distance z along the electrode, given by the voltage applied to the modulator RF input terminal ($V_{appl}$), is obtained by replacing time t by $t = z/v_{opt}$ in EQ(3):

$$V_{RF}(z) = V_{appl} e^{-\alpha_{RF} z} \cos\left(\omega_{RF} \frac{z}{v_{opt}} - \beta z\right) \quad (5)$$

$$= V_{appl} e^{-\alpha_{RF} z} \cos\left[\frac{\omega_{RF}}{c} z (n_{gopt} - n_{RF})\right]$$

which is dependent on the propagating refractive index difference ($n_{RF} - n_{gopt}$) between the RF wave and optical wave. Assuming zero RF loss ($\alpha_{RF} = 0$) for simplicity, the average effective voltage $V_{av}$ seen by the optical field in a device with interaction length L is then given by integrating EQ(5) over L to be:

$$V_{av} = \frac{\int_0^L V_{RF}(z)}{L} = V_{appl} \frac{\sin x}{x} \Box r_{v-mismatch} V_{appl} \quad (6)$$

$$x = \frac{\omega_{RF}}{c} (n_{RF} - n_{gopt}) L$$

Figure 5:
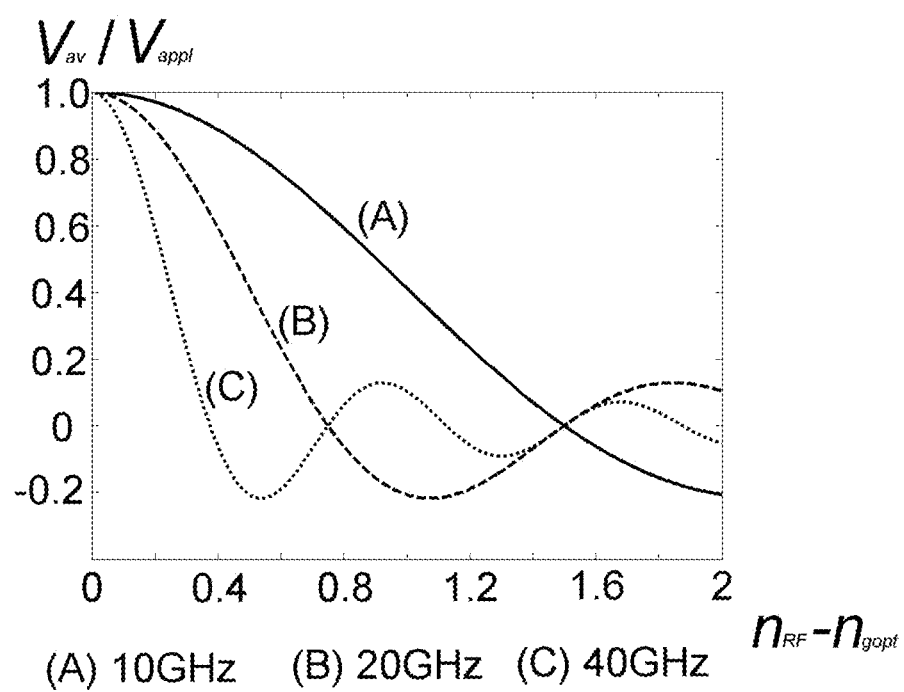
FIG. 5. The ratio of average effective voltage $V_{av}$ over the terminal voltage $V_{appl}$ denoted by $r_{v\text{-}mismatch}$ versus the velocity mismatch, assuming no RF loss for a 1 cm long device FIGS. 6A-C. Side-Conduction Geometry: The TC is a thin layer (~50-100 nm) between the conventional cladding layer and the EO core layer. The optical mode is still confined by the conventional claddings. Horizontally, the optical mode can be confined using three different geometries, shown as: (A) Top rib waveguide geometry of the prior art; (B) Bottom trench waveguide geometry; and (C) Buried waveguide geometry.

This effect is called velocity mismatch or velocity walk-off because physically the difference between $n_{RF}$ and $n_{gopt}$ causes the RF wave and optical energy to travel at different speeds, resulting in a higher switching voltage $V_\pi$ comparing to the applied voltage $V_{appl}$. From FIG. 5 we see that since the velocity mismatch has a significant impact on the modulator frequency bandwidth, the ideal design for a low voltage EO modulator is to have zero velocity mismatch, or to have perfect match between the $n_{RF}$ and $n_{gopt}$. For example, for a 1 cm long device operating at 40 GHz, even a slight $(n_{RF} - n_{gopt}) = 0.3$ will cause V, to drop below half of $V_{appl}$.

The use of TC materials as modulator bridge electrodes, discussed above, is not as straightforward as it might first seem because the TCs are never as conductive as metallic electrodes and hence, careful device structural design based on realistic TC optical and electrical properties must be made in order to realize modulators with low switching voltages, high modulating frequencies, and low optical losses. There are two basic device geometries for TC-based travelling-wave EO modulators: (1) A top-down conduction geometry (TDCG) and (2) A side conduction geometry (SCG). The schematic for the prior TDCG design is shown in FIG. 3. In TDCG, the TC is used both as the waveguide cladding layers to separate the metal electrodes (optically lossy) from the waveguide core and as the conducting layer to introduce the driving voltage directly to the waveguide core. This geometry requires that the TC have an optical refractive index ($n_{TC}$) lower than that of the EO material used as the waveguide core layer in order to confine the optical mode inside the waveguide core region. However, typical organic EO materials have refractive indices of 1.5-1.7, lower than the refractive indices of most TC materials (typically larger than 1.7). As a result, TDCG is in general not suitable for use with organic EO materials.

Figure 6A:
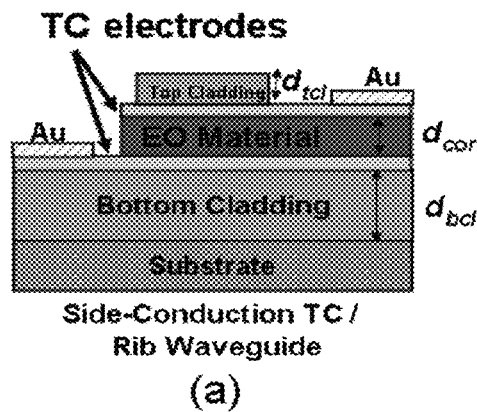
Figure 6B:
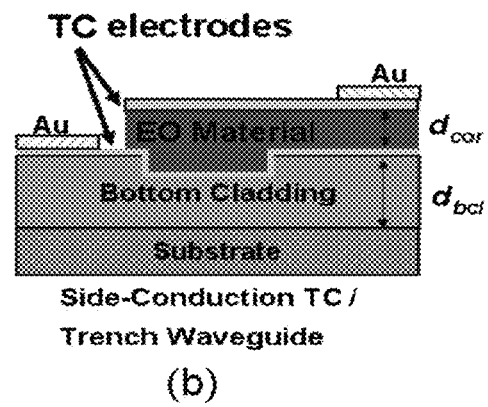
Figure 6C:
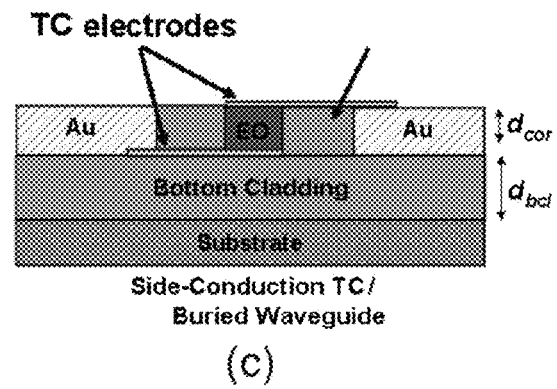

Such issues promote the concept of a SCG device, which is illustrated in FIG. 6. In this geometry, vertical the optical energy is still confined by a conventional waveguide cladding layer which has a lower refractive index than the refractive index of the EO core layer, and the TC is designed to be a thin layer with thickness $d_{TC}$~50-100 nm (thin compared to the optical mode size) between the cladding layer and the waveguide core layer. This geometry does not require the TC material to have a lower refractive index than that of the waveguide core layer. Therefore, the SCG design is more suitable than the TDCG design for organic EO materials.

Laterally, there are three ways to confine the mode. One approach (top ridge structure), as described in previous work, is to form a rib (or ridge) waveguide on top of the EO layer using materials with lower optical refractive indices than that of the EO material as shown in FIG. 6(A). The second approach (bottom ridge structure) is to form a trench on the bottom cladding material with low refractive index and fill in the EO material in the trench as shown in FIG. 6(B), so that it forms an "inverted rib waveguide" structure to provide the lateral mode confinement. The third approach (buried structure) is to etch through the EO material and fill the side of the EO material with materials having low refractive indices so as to form side waveguide claddings.

As will be depicted below, another advantage of the SCG design is that it has a lower fraction of optical energy confined in the TC material than in the case of the TDCG device, and hence allows the TC material to have higher optical loss, which makes it easier to engineer the TC material. The thin thickness for the TC material in the SCG case also makes the TC material easier to deposit and encounters fewer problems in terms of thermal expansion matching with its surrounding materials.

The TC materials should have as low optical absorption as possible since the guided optical mode energy overlaps with them spatially. In order to reach high modulation speeds, the TCs should be as conductive as possible without trading off their optical losses. While the TC conductivity can be enhanced with the increase of free carrier concentration, a fundamental limit is the absorption of optical energy due to the free carriers, called free-carrier absorption. For TC materials, optical absorption typically increases with the free carrier concentration, so the optical absorption loss per unit length (or "optical absorption coefficient", denoted by $\alpha_{TCopt}$ with units of "/cm") is roughly proportional to its electrical conductivity (denoted by $\sigma_{TC}$ with units of "S/cm"), within typical materials types if the optical absorption is dominated by free-carrier absorption: $\Delta\alpha = (e^3\lambda^2/4\pi^2 c^3 \epsilon_0 n)[\Delta N_e/m_{ce}^{*2}\mu_e + \Delta N_h/m_{ch}^{*2}\mu_h]$, where e is the electronic charge, $\epsilon_0$ is the permittivity of free space, n is the refractive index of the material, $m_{ce}^*$ is the conductivity effective mass of electrons, $m_{ch}^*$ is the conductivity effective mass of holes, $\mu_e$ is the electron mobility, and $\mu_h$ is the hole mobility. (R. Soref, J. Larenzo, All-silicon active and passive guided-wave components for $\lambda=1.3$ and 1.6 µm, Quantum Electronics, IEEE Journal of 22, 873-879, 1986.)

For the modulator applications, it is desirable to use TCs with a high conductivity to optical absorption loss ratios, which we will refer to as the TC figure of merit ($F_{TC}=\sigma_{TC}/\alpha_{TCopt}$, having units of "S"). There are various growth methods known in the art for TC materials, including metal-organic chemical vapor deposition (MOCVD), ion-assisted deposition (IAD), pulsed laser deposition (PLD), sputtering, etc. Table 2 shows a few of the TCs of interest, such as ZnO, In$_2$O$_3$, and TCP multi-layers, which have better transparency than the Sn-doped In$_2$O$_3$(ITO) at the fiber-optic communication wavelength of 1550 nm, their deposition methods, and typical $F_{TC}$ values.

TABLE 2

Some typical values of TC's Figure of Merit achieved experimentally, in conjunction with this invention.

| TC | $\sigma_{TC}$ (S/cm) | $\alpha_{TCopt}$ (/cm) | $F_{TC}$ (S) |
|---|---|---|---|
| IAD-In$_2$O$_3$-1 | 300 | 2000 | 0.15 |
| IAD-In$_2$O$_3$-2 | 108 | 800 | 0.13 |
| IAD-ZnO | 15 | 100 | 0.15 |
| IAD-ZnO/In$_2$O$_3$/ZnO | 98 | 150 | 0.65 |
| MOCVD-ZnO | 54 | 20 | 2.7 |

Figure 7:
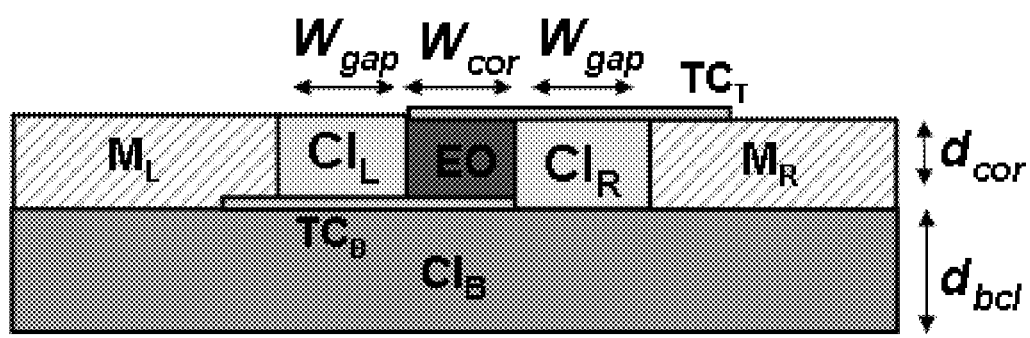
FIG. 7. A side-conduction modulator geometry with a buried waveguide structure. Two thin layers of TC material $TC_T$ and $TC_B$ are used to form a pair of "bridge electrodes" to side-conduct the voltage from the metallic transmission line and to apply the switching voltage directly across the waveguide core with organic EO material. In this case, the metallic electrodes $M_L$ and $M_R$ form a coplanar slot line structure. The two side claddings $CL_L$ and $CL_R$ help to confine the optical mode in the horizontal direction. The structure is located on top of a bottom cladding $CL_B$.

Design considerations for a low-voltage high-speed EO modulator can be considered, with illustration of the design algorithm for the case of a TC-based modulator with the side-conduction geometry. A representative geometry is shown in FIG. 7. In the SCG design with a buried optical waveguide structure, two metal electrodes, left electrode ($M_L$) and right electrode ($M_R$), form a coplanar slot transmission line. Two TC electrodes, top electrode ($TC_T$) and bottom electrode ($TC_B$), form a pair of parallel plates to apply the switching voltage directly across the EO waveguide core layer. The geometry for the metallic transmission line can be in various forms such as in the form of a co-planar transmission line, parallel-plate transmission line, or other RF transmission line geometry.

The half-wave voltage $V_\pi$ of the TC-based organic EO modulator structure is given by EQ(2) with $d_{el-sep}=d_{cor}$ and $V_\pi$ is related to the ratio $d_{el-sep}/\Gamma_{EO}$ in EQ(2). We can define an "effective thickness" $d_{eff}=d_{el-sep}/\Gamma_{EO}$ for EQ(2). The electro-optic mode overlapping factor $\Gamma_{EO}$ can be divided into the vertical and horizontal components: $\Gamma_{EO}=\Gamma_{VEO}\times\Gamma_{HEO}$. The vertical component $\Gamma_{VEO}$ is given by the amount of the optical mode energy overlapping with the EO slab in the vertical direction (the EO slab includes the EO core and the two side claddings that confine the mode horizontally), which accounts for the fact that optical mode energies in the upper and lower claddings are not being modulated as there is no EO material or modulating electric field there. The horizontal component $\Gamma_{HEO}$ accounts for the remaining horizontal mode confinement in the EO core and will reach unity ($\Gamma_{HEO}=1$) if the EO core (and its associated applied electric field) is sufficiently wide to horizontally cover the entire optical mode in the slab region. $\Gamma_{VEO}$ will drop from unity when the EO core layer thickness $d_{cor}$ is thin and the optical mode begins to spread into the top and bottom cladding layers. The minimum $V_\pi$ is determined by the minimum of $d_{eff}$ which is the only geometry dependent factor in EQ(2).

Figure 8:
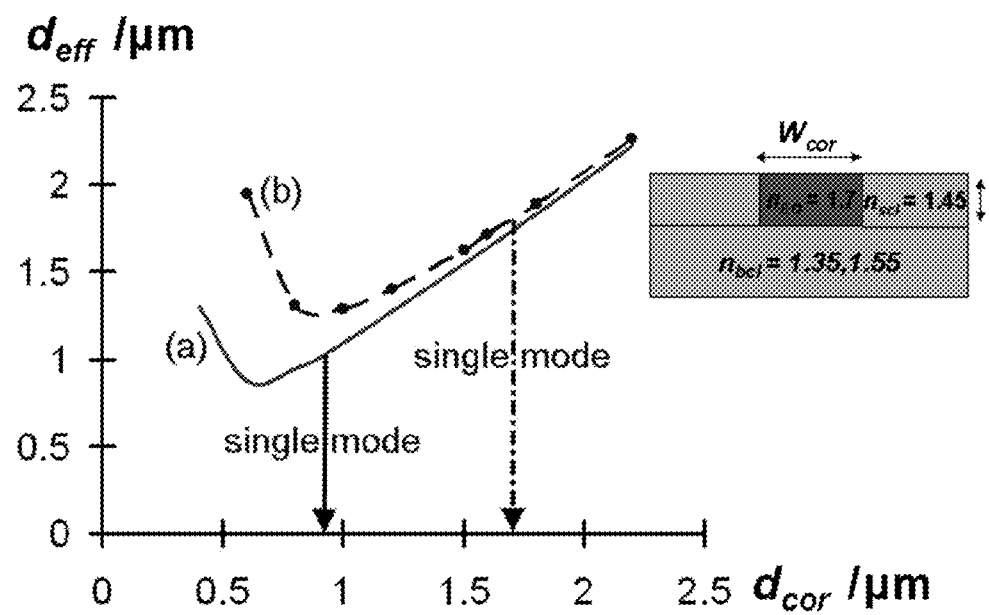
FIG. 8. Calculated $d_{eff}$ as a function of $d_{cor}$. ($\lambda=1.55$ µm, $n_{cor}=1.7$, $n_{scl}=1.45$) for two cases: (a) $n_{bcl}=1.35$ (solid line) and (b) $n_{bcl}=1.55$ (dotted line). We assume $W_{cor}=3$ µm so that $\Gamma_{HEO}=1$ to determine the effect of $d_{eff}$ on $\Gamma_{VEO}$. Arrows indicate vertical single-mode cutoff points.

If $\Gamma_{HEO}=1$, $d_{eff}$ will depend only on $\Gamma_{VEO}$. As discussed above, $\Gamma_{VEO}$ varies with $d_{cor}$. Assuming $\Gamma_{HEO}=1$, in FIG. 8 we plot $d_{eff}$ as a function of $d_{cor}$ with $\lambda=1.55$ μm, $n_{cor}=1.7$, $n_{scl}=1.45$, $n_{bcl}=1.35$ (solid line) and $n_{bcl}=1.55$ (dotted line). From FIG. 8 we see that for $n_{bcl}=1.35$, the TC-based organic modulator structure can have a minimum effective thickness of $d_{eff}=0.88$ μm when the real core thickness $d_{cor}=0.6$ μm. At $d_{cor}=0.6$ μm (for lowest voltage operation), the overlap $\Gamma_{VEO}=69\%$, and if $d_{cor}=1.5$ μm (for voltage-frequency response balance operation), $\Gamma_{VEO}$ can be as high as 97%. However, for $n_{bcl}=1.35$, $d_{cor}=1.5$ μm, which is no longer a single mode. To achieve single mode operation with $d_{cor}=1.5$ μm, we would need $n_{bcl}=1.55$, at which $\Gamma V_{VEO}=92\%$. As an example, suppose $r=r_{33}=150$ pm/V, then the corresponding $V_\pi L=0.17$ V-cm (assuming push-pull operation). Thus, the switching voltage can be as low as 1 V even with a short, 1.7 mm long device. However, there is also a trade off between the low half-wave voltage and large electrical bandwidth because of the increased capacitance C when $d_{cor}$ is thin, resulting in RC-cutoff at lower frequency. In addition, there is increased RF loss and optical loss in the TC region when $d_{cor}$ decreases, while the thickness-conductivity product of the TC layer remains unchanged. We will discuss the voltage-bandwidth trade off in detail below.

For a certain EO thickness $d_{cor}$, $\Gamma_{VEO}$ is fixed, and $\Gamma_{HEO}$ is determined by the width of the core, $W_{cor}$ (assuming uniform electric field). A wider waveguide core will have a larger $\Gamma_{HEO}$ and therefore a larger $\Gamma_{EO}$ which gives lower $V_\pi$. However, this also requires wider overlapping TC parallel plates, which will result in larger capacitance C and higher RF loss, and both of them will limit the frequency response of the device. To find the optimal $W_{cor}$, we next analyze $\Gamma_{HEO}$ trends with increasing $W_{cor}$.

Figure 9A:
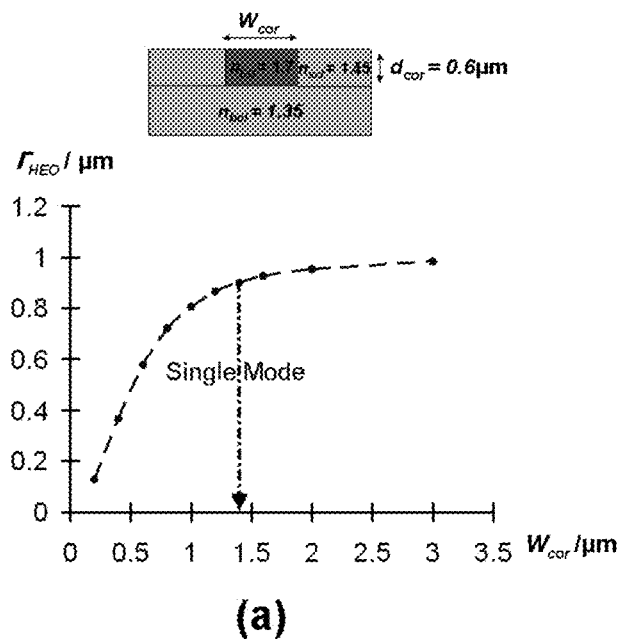
FIGS. 9A-B. Dependence of $\Gamma_{HEO}$ on $W_{cor}$: (A) $d_{cor}=0.6$ µm, $n_{bcl}=1.35$ (B) $d_{cor}=1.5$ µm, $n_{bcl}=1.55$. Here we assume $\lambda=1.55$ µm, $n_{EO}=1.7$, and $n_{scl}=1.45$ FIGS. 10A-B. Example of the metal induced loss coefficient (both left and right side included) vs. gap size. (A) low $n_{bcl}$ where $d_{cor}=0.6$ um, $n_{bcl}=1.35$ (B) high $n_{bcl}$ where $d_{cor}=1.5$ um, $n_{bcl}=1.55$.
Figure 9B:
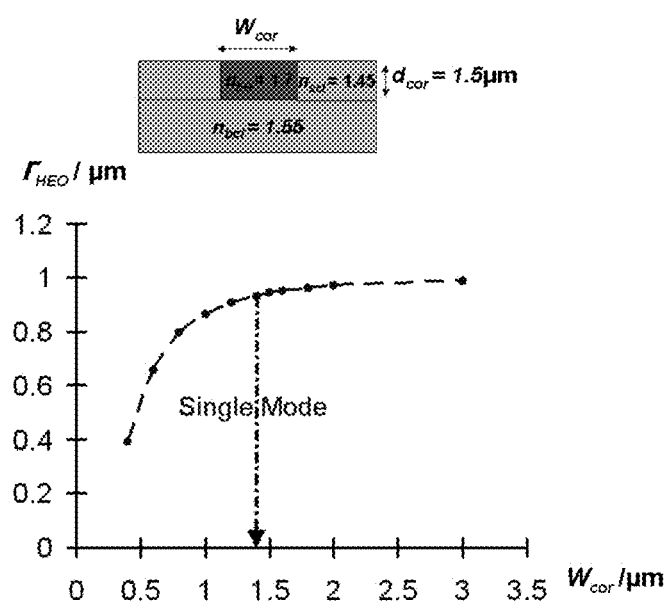

From FIG. 9, we can see that $\Gamma_{HEO}$ increases rapidly to 0.8-0.9 when $W_{cor}$ increases from 0.5 μm to 1 μm, and then increases gradually to 1 when $W_{cor}$ increases from 1 μm to 2 μm. A single optical guided mode (in horizontal direction) would require $W_{cor}$ to be smaller than 1.4 μm. Therefore, to have sufficiently high $\Gamma_{HEO}$ without limiting the bandwidth too greatly and to maintain a single mode, we can choose $W_{cor}=1$ μm.

Another important factor in the modulator horizontal direction that will determine the bandwidth of the device is the gap between the EO core and the metal electrode ($W_{gap}$). In order to decrease the electrical resistance R from the metal electrode to the TC parallel plate region and increase the RC cutoff frequency, $W_{gap}$ must be minimized, and the minimal value of the $W_{gap}$ is determined by the metal induced optical loss.

Figure 10A:
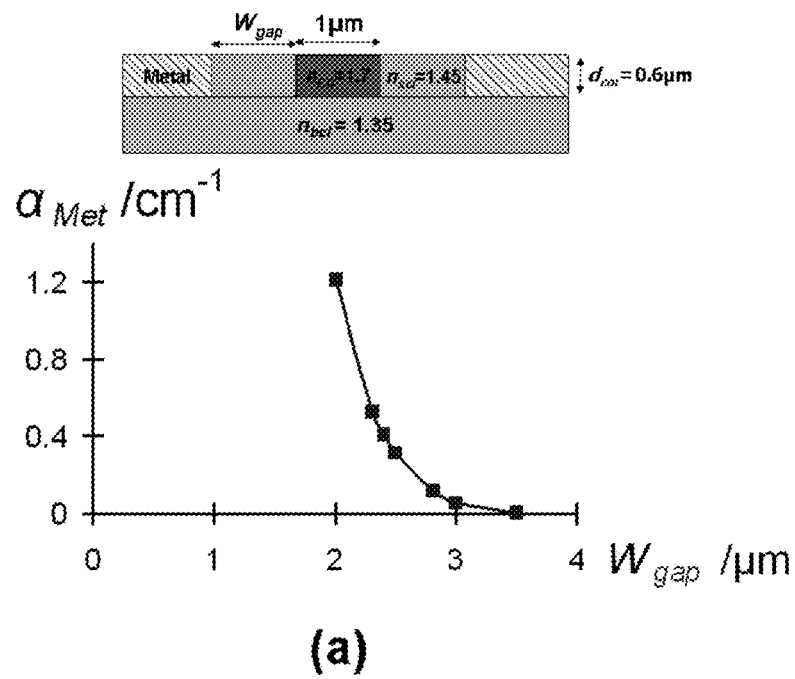
Figure 10B:
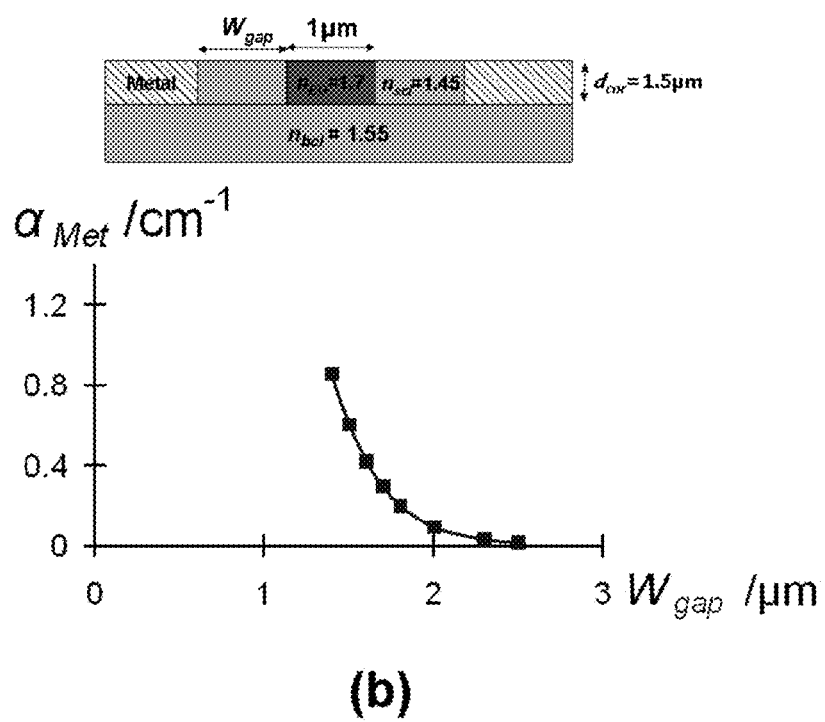

FIG. 10 shows an example of the numerical simulation of the relationship between the metal induced loss coefficient $\alpha_{Met}$ versus the distance between the metal electrode and the buried optical waveguide. As an optimal design, we will choose a $W_{gap}$ so that the metal-induced optical loss is approximately the same value as the optical loss induced by the TC layers.

For a TC material with a given figure of merit $F_{TC}$, and a given optical loss coefficient $\alpha_{TCopt}$, a relevant device consideration is that the modulator has low optical loss for an optical beam propagating through the modulator. The total loss of an optical waveguide device with TC layers is given by: $I_{out}=I_{in}\times T_{TC}\times T_{Met}\times T_{oth}$, where $T_{TC}$ is the optical power transmission coefficient accounting for the optical loss caused by the TC layer alone, which can be further described by: $T_{TC}=\exp(-\alpha_{TCopt}\Gamma_{TC}L)$, where L is the length of TC layer in the device (it is also the modulator interaction length) and $\Gamma_{TC}$ is the percentage of optical mode energy overlapping with the TC layer (the TC optical-mode overlapping factor). $T_{Met}$ is the transmission coefficient accounting for the optical loss due to the optical power touching the metal transmission line on both sides and is given by $T_{Met}=\exp(-\alpha_{Met}L)$. As mentioned above, for an optimal design, we can let $T_{Met}=T_{TC}$. $T_{oth}$ is the transmission efficiency accounting for the optical-fiber coupling efficiency and other waveguide propagation losses assuming that the TC layer has no optical loss. For the same TC material, increasing the thickness of the TC layer, $d_{TC}$, will increase the TC mode overlapping $\Gamma_{TC}$ and therefore cause higher optical loss.

A typical commercial LiNbO$_3$ EO modulator has a device optical insertion loss of lower than 6 dB (<75% loss in optical power). The typical fiber coupling loss at the input and output ports can typically be lower than 30% per port, yielding a total coupling loss of less than 50%. Assuming that other propagation losses, including EO material absorption loss, total up to be less than 20%, $T_{oth}$ will be no less than $(1-0.3)\times(1-0.3)\times(1-0.2)\approx 0.4$. In order to achieve a similar total device insertion loss of 6 dB for our modulator design, it is desirable to keep the optical propagation loss due to TC and metal to be less than 40% (i.e., keep $(T_{TC}\times T_{Met})>0.6$ or $T_{TC}>0.77$ if $T_{TC}=T_{Met}$), so that $(T_{oth}\times T_{TC}\times T_{Met})$ will be greater than 0.25 (<75% loss or <6 dB total device insertion loss). For here and all the examples we give below, we will assume an RF-optical interaction length $L=0.5$ cm, so that the optical transmission $T_{TC}$ will be over 0.8 if $$\alpha_{TCopt}\Gamma_{TC}<\ln(0.8)/L=0.22/L \text{ (for L in cm)} \tag{7}$$

which requires $\Gamma_{TC}<0.44/\alpha_{TCopt}$ when $L=0.5$ cm. For a given L, the allowed $\alpha_{TCopt}$ is not fixed, but the factor $\alpha_{TCopt}\Gamma_{TC}$ is fixed. Since $\Gamma_{TC}$ is approximately proportional to $d_{TC}$, the TC figure of merit $F_{TC}=\sigma_{TC}/\alpha_{TCopt}$ will then give a certain "fixed" conductivity-thickness product ($\sigma_{TC}d_{TC}$) for the TC layer. As discussed below, the conductance per unit length given by $\sigma_{TC}d_{TC}/W_{TCeff}$ ($W_{TCeff}$ is the effective conductance width of the TC) has an impact on the modulator RC frequency cutoff. Since the allowed $\alpha_{TCopt}\Gamma_{TC}$ is inversely proportional to the modulator length L, then for a given $F_{TC}$ there is a specific modulator length (or switching voltage) versus frequency bandwidth trade off. To achieve this generally low overlapping factor, $d_{TC}$ must be small, approximately 50-100 nm, compared to the vertical optical mode size $D_{VMfwhm}$ (defined at the full-width half-maximum (FWHM) of the mode energy). The TC overlapping factor is approximately given by $\Gamma_{TC}\sim d_{TC}/D_{VMfwhm}$. Since $\Gamma_{TC}$ may be solved exactly computationally using Mode Solver, we can use this to define an effective vertical mode size $D_{VMeff}$ to be exactly given by $D_{VMeff}=d_{TC}/\Gamma_{TC}$. Taking $D_{VMeff}\sim D_{VMfwhm}$ is only an approximation.

From the requirement that the TC optical loss factor $\alpha_{TCopt}\Gamma_{TC}<0.22/L$, we have $\alpha_{TCopt}d_{TC}/D_{VMeff}=0.22/L$. With use of the TC figure of merit $F_{TC}=\sigma_{TC}/\alpha_{TCopt}$, one can find the highest allowed TC conductance per unit length:

$$\sigma_{TC}d_{TC}/W_{TCeff}=(0.22/L)F_{TC}D_{VMeff}/W_{TCeff} \tag{8}$$

Since $\sigma_{TC}$ and $\alpha_{TCopt}$ can be tuned simultaneously by controlling the dopant density of the TC material, for a chosen $d_{TC}$ (and the given $F_{TC}$, L, and $D_{VMeff}$), we can engineer the dopant density so that EQ(7) is satisfied. Typically, $\sigma_{TC}$ is not as high as that of typical metals such as gold or copper. Hence, TC cannot be used to form a low-loss RF transmission line, but can only used as a bridge-electrode to conduct voltage from the metallic transmission line to the EO waveguide core.

Figure 11:
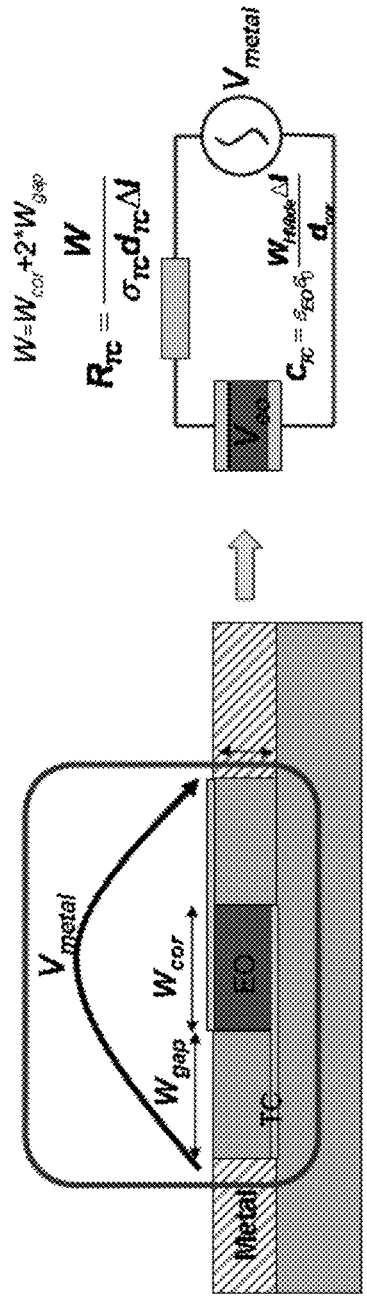
FIG. 11. Effective circuit model for TC-based EO modulator structure. Here $W_{TCeff}=W_{cor}/2+W_{gap}$ is the effective conductance width of the TC resistor.

As an effective circuit model, the TC bridge-electrode material can be modeled as a resistor connecting the transmission line to the EO region, and the EO region with top and bottom TC electrodes can be modeled as an effective capacitor as shown in FIG. 11. This effective RC element gives a TC-RC-cutoff frequency to a TC-based modulator. There are also other frequency limiting factors. The TC-RC-cutoff is only one of the factors and is due to the material parameters and the geometry of the TC-based bridge electrodes.

More specifically, based on the effective circuit model, the voltage applied across the EO layer $V_{EO}$ versus the voltage at the metallic transmission line $V_{Met}$ is given by:

$$\left|\frac{V_{eo}}{V_{metal}}\right| = \frac{1}{\sqrt{(2\pi f R_{TC} C_{TC})^2 + 1}} \quad \text{EQ (9)}$$

where $R_{TC}$ is the combined resistance-length product of the top and bottom TC bridge electrodes, and $C_{TC}$ is the capacitance per unit length, which are defined in FIG. 11.

If we define the frequency bandwidth $f_{BW}$ to be the RF frequency at which $V_{eo}=V_{metal}/2$ (when the optical power drops by half), then $$f_{Bw-TC-RC} = \frac{\sqrt{3}}{2\pi R_{TC} C_{TC}} \quad \text{EQ (10)}$$

This will be referred to as the 3 dB optical power modulation bandwidth limitation due to the TC bridge electrode ($f_{BW-TC-RC}$). From our deposition experience, TC films sputtered at room temperature can typically be engineered to achieve $F_{TC}$ between 0.1 S to 1 S. With high temperature growth methods (e.g., MOCVD), $F_{TC}$ ~1-10 S can also be achieved. For the discussion below, we assume a mean $F_{TC}$ value of 1 S. $R_{TC}$ can be obtained from $R_{TC}=2W_{TCeff}/\sigma_{TC}d_{TC}$ (the factor of 2 arises from adding top and bottom TCs) and $C_{TC}$ is simply given by $C_{TC}=\in_{EO}W_{cor}/d_{cor}$.

In terms of design, two regions of operation can be considered: (1) Lowest voltage case (LV case). In this case, the design will push towards the lowest switching voltage. From FIG. 8, we see that in this case it is advantageous to work just above the minimal $d_{eff}$ with $d_{cor}$ of about 0.6-0.8 μm to achieve close to the lowest voltage but still having a reasonably high frequency response; (2) Voltage-frequency balance case (VFB case). In this case, the design will balance between the achievements of low enough voltage and high enough frequency response. From FIG. 8, we see that in this case, it is advantageous to work at $d_{cor}$ ~1.2-1.7 μm. The refractive index of the bottom cladding $n_{bcl}$ must be chosen to be close enough to that of the EO core $n_{cor}$ to make the waveguide a single-mode optical waveguide. It turns out that for the waveguide structure of FIG. 8, with $n_{cor}=1.7$ and $n_{bcl}=1.35$, the waveguide vertical mode is single mode (at λ=1550 nm) up to $d_{cor}$ of ~0.9 μm and with $n_{cor}=1.7$ and $n_{bcl}=1.55$, the waveguide vertical mode is single mode (at λ=1550 nm) up to $d_{cor}$ of ~1.7 μm. This single-mode $d_{cor}$ value can be made thicker (up to ~2.5 μm) by reducing the refractive index difference between $n_{cor}$ and $n_{bcl}$ by using appropriate material for the bottom cladding. Thus, in general, $d_{cor}$ must not be much thicker than 2.5 μm because of single mode considerations.

Illustrating the LV case (case 1), assuming $d_{cor}=0.6$ μm with buried waveguide structure; and the VFB case (case 2), assuming $d_{cor}=1.5$ μm with a buried waveguide structure, the following factors can be considered in the context of modulator design:

Step 1: Basic Structural Parameters.

We take the bottom cladding to be the polymer Cytop or benzocyclobutene (BCB) with refractive index $n_{bcl}=1.35$ or 1.55, and RF dielectric constant $\in_{RFbcl}=2.1$ or 2.5, respectively, and the EO waveguide core layer to have refractive index $n_{EO}=1.7$ and $\in_{RFEO}=3$. The optical wavelength is λ=1550 nm, and the EO waveguide core layer has an EO coefficient of $r=r_{33}=150$ pm/V. We assume that the TC is ZnO with refractive index $n_{TC}=1.7$, $F_{TC}=1$ S, optical loss coefficient $\alpha_{TCopt}=10/cm$, and conductivity $\sigma_{TC}=10$ S/cm. We assume L=0.5 cm.

Step 2: Optical Loss Considerations

From EQ(7), we require: $\alpha_{TCopt}\Gamma_{TC}<0.22/L$. For L=0.5 cm and $\alpha_{TCopt}=10/cm$, we obtain $\Gamma_{TC}=0.044$ (4.4%). The required TC thickness (top and bottom) $d_{TC}$ to give a total $\Gamma_{TC}=0.044$ for $d_{cor}=0.6$ μm is 50 nm, and for $d_{cor}=1.5$ μm it is 130 nm.

Step 3: Choosing $W_{cor}$ and the Corresponding $V_\pi$

From FIG. 9, we choose $W_{cor}=1$ μm so $\Gamma_{HEO}=0.8$ when $d_{cor}=0.6$ μm and $\Gamma_{HEO}=0.85$ when $d_{cor}=1.5$ μm. From FIG. 8, we find $V_\pi 2=0.26$ or 0.43 V (push-pull) when $d_{cor}=0.6$ or 1.5 μm, respectively.

Step 4: Choosing $W_{gap}$

To optimize the design, we shall also choose $W_{gap}$ so that metal optical loss is approximately equal to the TC optical loss, which means $\alpha_{Met}=0.44/cm$. From FIG. 10, we obtain $W_{gap}=2.4$ or 1.6 μm when $d_{cor}=0.6$ or 1.5 μm, respectively.

Step 5: Computing TC-RC-Frequency Cutoff

From the design, we tabulate in Table 3 the various parameters for computing the TC-RC-Frequency cutoff ($f_{BW-TC-RC}$)

TABLE 3

Optical power bandwidth of 3 dB achievable at different combinations of TC thicknesses assuming λ = 1.55 μm, $W_{gap}$ = 2.4 μm/1.6 μm (for $d_{co\,r}$ = 0.6 μm or 1.5 μm), $\in_{EO}$ = 3, $r_{33}$ = 150 pm/v, L = 5 mm with push-pull operation.

| $d_{cor}$ | $V_\pi$ | $\sigma_{TC}d_{TC}$ | $R_{TC}$ | $C_{TC}$ | $f_{BW-TC-RC}$ |
|---|---|---|---|---|---|
| 0.6 μm | 0.22 V | 4.6 × 10⁻⁵ S | 0.13 Ω-cm | 44 pF/cm | 50 GHz |
| 1.5 μm | 0.42 V | 1.4 × 10⁻⁴ S | 0.03 Ω-cm | 18 pF/cm | 525 GHz |

From Table 3 we can see that thinner EO layers will give lower $V_\pi$, but will limit the RC cutoff bandwidth because they will increase the capacitance of the parallel plates and also decrease the allowed TC conductivity due to the increase of optical mode energy in the TC layer.

Besides the TC-RC voltage drop, the full frequency response can also be determined by three other factors. First, in the direction of propagation, the RF loss at high frequency causes the amplitude of the RF wave to decay exponentially, and therefore the average voltage along the metal transmission line will drop below the low frequency value. Secondly, the velocity mismatch between the RF wave and optical wave discussed before will also greatly impact the effective switching voltage seen by the optical wave. Finally, the characteristic impedance mismatch between the device and the RF source will cause reflection of the RF wave from the device back to the RF source and therefore decrease the effective driving voltage coupled into the device. By taking into consideration the RF loss coefficient, the velocity mismatch, the TC-RC voltage drop, and the transmission line characteristic impedance simulated before, the effective voltage applied across the EO material along the TC electrodes is:

$$V_{eff}(z, f, V_{appl}) = \\ V_{appl} \cdot \frac{V_{eo}(f)}{V_{metal}(f)} \cdot \frac{T}{1 - \Gamma_L \Gamma_S e^{-2\gamma\mu L}} \cdot \left[ e^{-\alpha_{RF}x} e^{j\left(\frac{\omega}{V_{gopt}} - \beta_{RF}\right)z} + \Gamma_L e^{-\alpha_{RF}(2L-x)} e^{j\omega\frac{z}{v_{Opt}} j\beta_{RF}(2L-z)} \right] \quad (11)$$

Here $V_{appl}$ is the RF source voltage, $$\Gamma_L = \frac{Z_L - Z_m}{Z_L + Z_m} \text{ and } \Gamma_s = \frac{Z_s - Z_m}{Z_s + Z_m}$$

are the reflection coefficients of the RF microwave (if the line impedance $Z_m$ is different from the source impedance $Z_s$ or the load impedance $Z_L$; RF reflection will appear both at the entry point and the terminus of the transmission line), L is the length of the device. $V_{eo}(f)/V_{metal}(f)$ defined as $r_{RC}(f)$ is the TC-RC cut-off factor. The RF reflection can be eliminated by designing the structure of the device to have $Z_m = Z_s = Z_L$. Then $\Gamma_L = \Gamma_s = 0$ and EQ(11) becomes $$V_{eff}(x, f) = V_{appl} \cdot \frac{V_{eo}(f)}{V_{metal}(f)} \cdot e^{-\alpha_{RF}x} \cdot e^{j\left(\frac{\omega}{V_{gopt}} - \beta_{RF}\right)x} \quad (12)$$

The velocity mismatch term $$e^{j\left(\frac{\omega}{V_{gopt}} - \beta_{RF}\right)x}$$

can also be eliminated if we can achieve perfect velocity matching, or $\beta_{RF} = \omega/v_{RF} = \omega/v_{gopt}$ (which means $n_{RF} = n_{gopt}$). Then, $(\omega/v_{RF}) - \beta_{RF} = 0$ and EQ(12) becomes:

$$V_{eff}(x, f) = V_{appl} \cdot \frac{V_{eo}(f)}{V_{metal}(f)} \cdot e^{-\alpha_{RF}x} \quad (13)$$

The averaged effective switching voltage $V_{av-eff}(f)$ in a modulator with interaction length L is found by integrating the effective switching voltage $V_{eff}(x,f)$ seen by the optical wave from 0 to L:

$$V_{av-eff}(f) = \int_0^L V_{eff}(x, f, V_{appl}) = V_{appl} \cdot \frac{V_{eo}(f)}{V_{metal}(f)} \cdot \frac{(1 - e^{-\alpha_{RF}(f)L})}{\alpha_{RF}(f)L} \quad (14)$$

From EQ(14), we can see that if the RF reflections and velocity mismatch can be eliminated, the averaged effective switching voltage $V_{av-eff}(f)$ is determined mainly by two factors: one is the TC-RC voltage drop factor $r_{RC}(f)$, which is a function of frequency f as discussed before, and the other is the RF decay factor $(1-e^{-x})/x$, in which $x = \alpha_{RF}(f)L$. The RF decay factor is also a function of frequency f because the RF decay coefficient $\alpha_{RF}(f)$ will increase with frequency f. The electrical bandwidth of an EO modulator can then be found by solving for the frequency $f_{BW}$ at which the $V_{av-eff}$ drops to $V_{appl}/2$ or $$r_{RC}(f_{BW}) \cdot \frac{(1 - e^{-\alpha_{RF}(f_{BW})L})}{\alpha_{RF}(f_{BW})L} = \frac{V_{av-eff}(f_{BW})}{V_{appl}} = 0.5 \quad (15)$$

in other words, if we have a targeted bandwidth $f_{BW}$, the requirement for $\alpha_{RF}(f)L$ is given by:

$$1 - e^{-x} = \frac{0.5}{r_{RC}(f_{BW})}x, \text{ here } x = \alpha_{RF}(f_{BW})L \quad (16)$$

In short, EQ(16) indicates that if most of the frequency cutoff is already determined by the TC-RC voltage drop frequency cutoff $r_{RC}$ (e.g., when $r_{RC}(f) \sim 0.5$), there is little room left for the RF loss, and a small $\alpha_{RF}(f)$ will push it to the cutoff (when the voltage drops to half). Thus, EQ(16) enables one to design or trade off between the TC-RC voltage drop frequency cutoff and the RF-Loss frequency cutoff, and it is similar for the frequency cutoffs due to velocity mismatch and frequency-dependant impedance mismatch.

Figure 12:
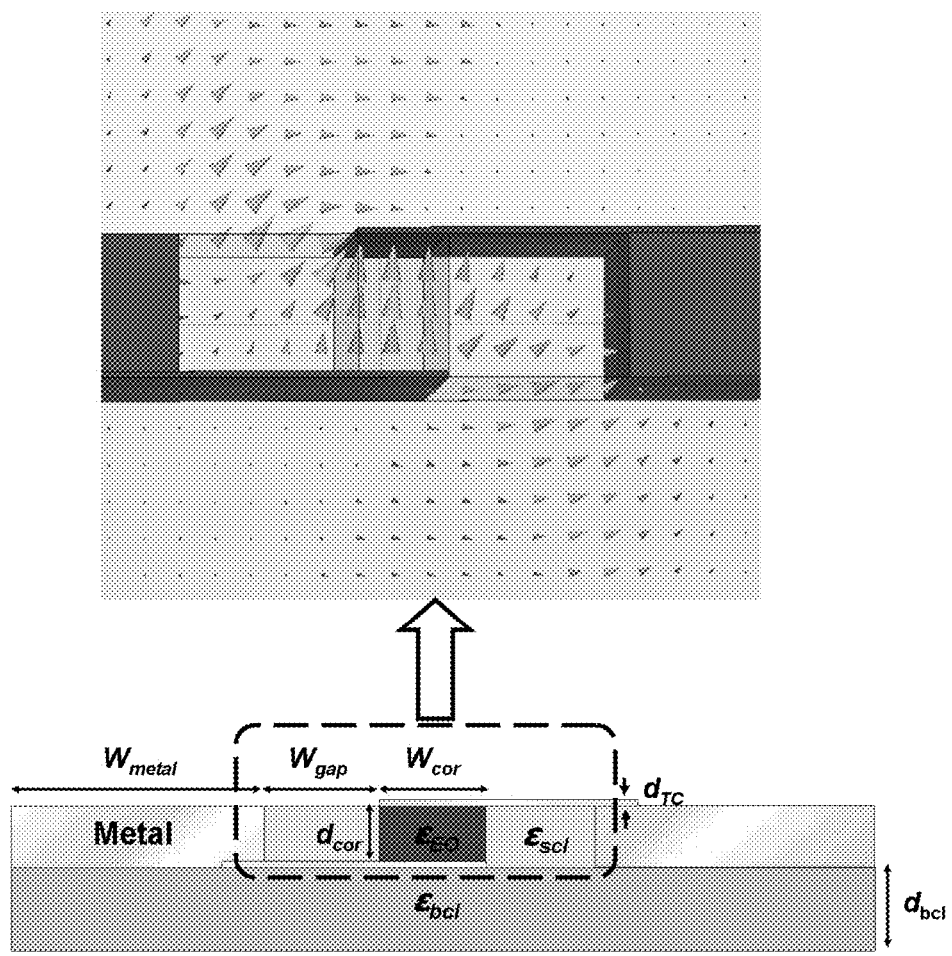
FIG. 12. A TC parallel plates, metal coplanar slot-line structures, and the parameters that can be tuned.

The design discussed above does not include the design of the transmission line, which is important for achieving a broad modulation bandwidth. Due to the relatively complex geometry, design of the transmission line requires numerical simulation. In order to simulate the frequency response of the entire modulator, including both the TC bridge electrode structure and the metallic transmission line structure, we use commercial electromagnetic simulation software based on finite element method. (E.g., High Frequency Structure Simulator, available through Ansoft Corporation.) FIG. 12 shows the structure of interest. In this structure, many parameters can be tuned such as the dimensions of the metal and TC electrodes, the material dielectric constant of the bottom cladding layer, and so on. The ultimate goal is to design a structure that can work at or above 40 GHz with the half wave voltage below 1 V, device length about or less than 1 cm, and RF transmission line impedance of around 50Ω.

More specifically, in order to have a broad frequency bandwidth structure, there are several design goals to consider:

1. Transmission line impedance $Z_0 = 50\Omega$ in order to work with a standard microwave system.
2. RF-Optical propagating refractive-index matching. If the optical propagating refractive-index is $n_{opt} = 1.6 = n_{gopt}$, (this can be obtained by numerical simulation), then the RF propagating refractive-index $n_{RF}$ should be targeted to be $n_{RF} = 1.6$, or the RF effective dielectric constant $\in_{RF}$ should be close to $\in_{RF} = 2.56$.
3. The modulator 3 dB RC cut-off bandwidth for optical intensity modulation should be larger than the targeted bandwidth $f_{BW}$, preferably about double to leave room for the other frequency cutoff factors. This is because the frequency response is not only cut off by RC voltage drop but also cutoff by the RF loss and velocity mismatch at high frequency.

In order to fully understand the high frequency operation of the modulator structure, we must analyze and design the structure step by step, from a metallic-transmission-line-in-air-only structure with the EO material dielectric constant $\in_{EO}$ present (MTLIA-EO) to the full EO modulator (FEOM) structure, including the TC bridge electrodes and the substrate.

The first step is to analyze and design the MTLIA-EO structure. In this case, we set TC conductivity $\sigma_{TC} = 0$ S/cm, and substrate bottom cladding dielectric constant $\epsilon_{sub}=\epsilon_{bcl}=1$ in FIG. 10, while the EO and side claddings are present with $\epsilon_{EO}=\epsilon_{scl}=3$. In the simulation we study three types of metal: gold, copper, and a perfect electric conductor (PEC) as the material for the MTLIA-EO structure.

Figure 13A:
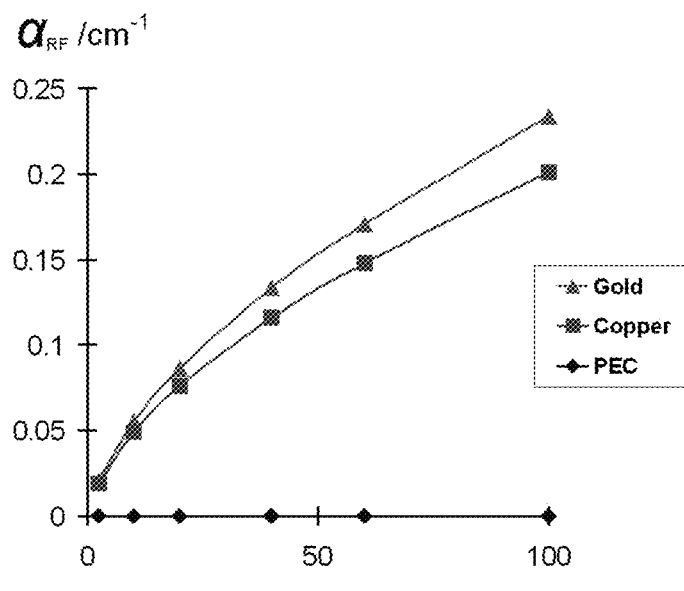
FIGS. 13A-C. Computational results for MTLIA-EO structure using gold, copper, and a perfect conductor as the metallic material: (A) RF loss coefficient $\alpha_{RF}$; (B) transmission line propagating dielectric constant $\in_{RF}$; and (C) transmission line characteristic impedance $Z_0$. We assumed the structure of FIG. 10 with $\sigma_{TC}=0$ S cm$^{-1}$, $\sigma_{Gold}=4.1*10^5$ S cm$^{-1}$, $\sigma_{Copper}=5.8*10^5$ S cm$^{-1}$, $\in_{TC}=3$, $\in_{EO}=3$, $\in_{scl}=3$, $\in_{bcl}=1$, $W_{metal}=250$ µm, $d_{metal}=d_{cor}=1.5$ µm, $d_{TC}=130$ nm, $W_{cor}=1$ µm, $W_{gap}=1.6$ µm, and $T_{bcl}=10$ µm.
Figure 13B:
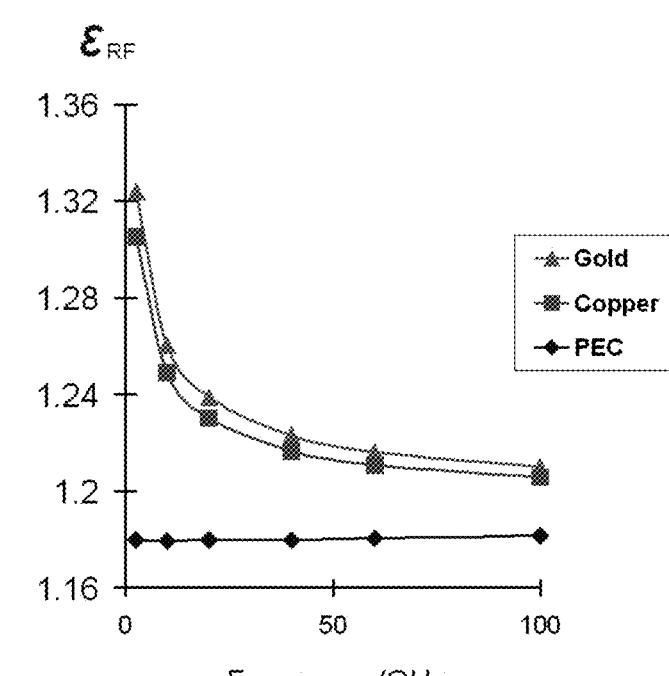

From FIG. 13(A) we can see that the RF loss coefficient $\alpha_{RF}$ with gold or copper is small, around $\alpha_{RF}=0.1$/cm at 40 GHz. Also copper electrodes have lower RF loss than gold electrodes because of the higher conductivity. We will see later that with the addition of the TC, the RF loss will become somewhat larger but can be managed. FIG. 13(B) shows the transmission line propagating RF dielectric constant $\epsilon_{RF}$ ($=n_{RF}^2$). We see that $\epsilon_{RF}$ is much smaller than the square of refractive index of the EO waveguide core ($n_{opt}=2.56$ from the numerical simulation the optical waveguide effective refractive index $n_{opt}$ is 1.6) because a large part of the RF mode is in air. The characteristic impedance of the transmission line is around 85Ω. As we will see later, with the addition of the TC, the line impedance drops to ~50Ω due to TC's resistive-capacitive loading effect.

Figure 13C:
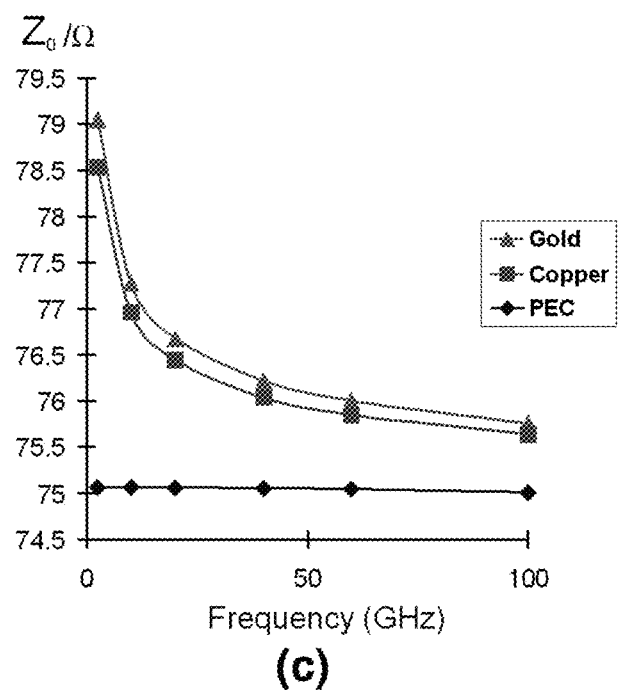
Figure 14A:
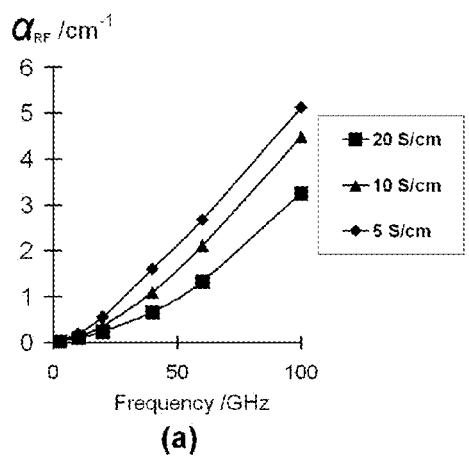
FIGS. 14A-D. Computational results for the full EO modulator (FEOM) structure with gold transmission line: (A) RF loss coefficient $\alpha_{RF}$; (B) transmission line propagating dielectric constant $\in_{RF}$; and (C) transmission line characteristic impedance $Z_0$; (D) $V_{eo}/V_{metal}$ plot showing the TC-RC frequency cutoff factor. We assume the structure of FIG. 10 with $\sigma_{TC}=5$ S/cm, 10 S/cm, 20 S/cm, $\sigma_{Metal}=\sigma_{Gold}=4.1*10^5$ S/cm, $\in_{TC}=3$, $\in_{EO}=3$, $\in_{bcl}=1$, $\in_{scl}=3$, $d_{metal}=d_{cor}=1.5$ µm, $d_{TC}=130$ nm, $W_{gap}=1.6$ µm, $W_{cor}=1$ µm, $W_m=250$ µm and $d_{bcl}=10$ µm FIGS. 15A-C. Computational results for the FEOM modulator structure with gold transmission line, illustrating the effect of the dielectric constant of the bottom cladding layer $\in_{bcl}$ on: (A) RF loss coefficient $\alpha_{RF}$; (B) transmission line propagating dielectric constant $\in_{RF}$; and (C) transmission line characteristic impedance $Z_0$. We assumed the geometry of FIG. 10 with $d_{TC}=130$ nm, $\sigma_{TC}=10$ S/cm, $\sigma_{Metal}=\sigma_{gold}=4.1*10^5$ S/cm, $\in_{TC}=3$, $\in_{EO}=3$, $W_{metal}=250$ µm, $d_{metal}=d_{cor}=1.5$ µm, $W_{Gap}=1.2$ µm, $W_{cor}=1$ µm and $d_{bcl}=10$ µm.

After studying the MTLIA+EO structure described above, we then study the full EO modulator (FEOM) structure by adding the TC-based bridge electrodes. We first explore different TC conductivities $\sigma_{TC}$ from 5 S/cm to 20 S/cm. From FIG. 14(A), we see that the first impact of the TC layer is that the RF loss $\alpha_{RF}$ becomes higher than that of the metallic transmission-line-only MTLIA-EO structure. When $\sigma_{TC}=10$ S/cm, $\alpha_{RF}$ is ~1.1/cm at 40 GHz, which is higher than that for the case with only gold electrodes ($\sigma_{TC}=0$ S/cm) for which $\alpha_{RF}=0.1$/cm at 40 GHz (see FIG. 13). Here, we see that a frequency limitation is the RF propagation loss when TC is present and $\alpha_{RF}$ is ~1.1/cm at 40 GHz. We can call this the TC-RF-Loss factor and label its bandwidth limitation a $f_{BW-TC-RFL}$.

Figure 14B:
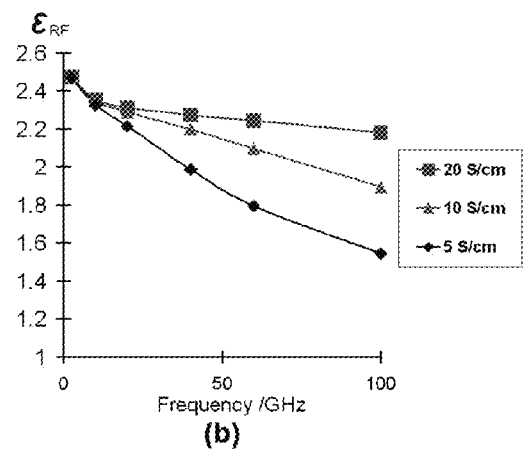
Figure 14C:
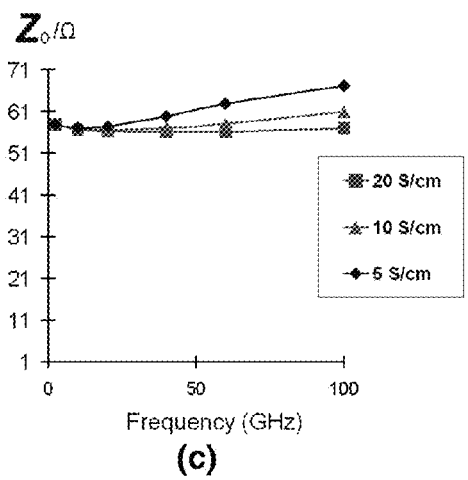
Figure 14D:
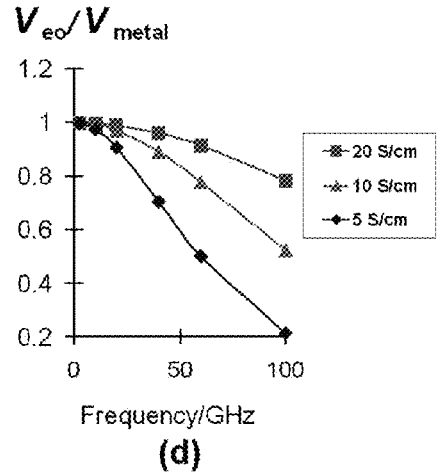

From FIG. 14(B), we see that the RF transmission line propagating dielectric constant $\epsilon_{RF}$ also changes from that of the MTLIA+EO only structure (from $\epsilon_{RF}=1.2$ to 2.2). This is because the TC-based bridge electrodes move more RF energy into the EO core region, which has a high dielectric constant of $\epsilon_{EO}=3$. However, since part of the RF mode is still in the air due to the metallic co-planar structure, $\epsilon_{RF}$ is still less than $\epsilon_{EO}$. From FIG. 14(C), we see that the characteristic impedance also drops from the MTLIA-EO structure value of 76Ω to 57Ω because the resistive TC bridge electrodes now play a part in determining the impedance of the hybrid structure due to its mainly resistive-capacitive loading. To investigate the TC-RC cut-off frequency discussed above, we compute the ratio of $V_{eo}/V_{metal}$ versus frequency for different TC conductivies in FIG. 14(D). Here $V_{eo}$ is the voltage across the two TC electrodes at the EO core, and $V_{metal}$ is the voltage across the two metallic electrodes. Besides the TC-RC cut-off bandwidth $f_{BW-TC-RC}$, the full modulator bandwidth is also affected by $f_{BW-TC-RFL}$, the metal RF loss bandwidth $f_{Bw-Metal-RFL}$, and the velocity matching bandwidth $f_{BW-Vel}$. From this section, it looks like the main frequency limitation for this particular example is from $f_{BW-TC-RFL}$ (it is lower than $f_{BW-TC-RC}$). The full modulator bandwidth is extracted by taking into consideration all the factors.

The transmission line effective dielectric constant, which is the key to achieving velocity matching, is also dependent on the material dielectric constant of the bottom cladding forming the substrate. This is because a significant portion of the RF field will be in the substrate.

Figure 15A:
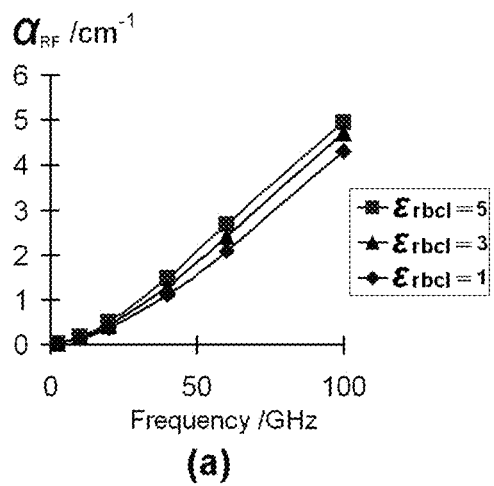
Figure 15B:
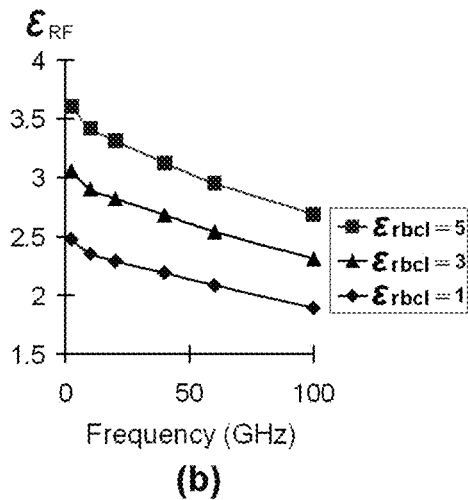
Figure 15C:
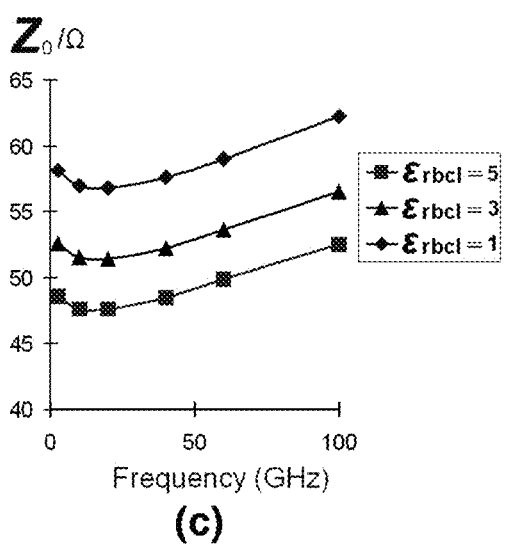

The effect of the dielectric constant of the bottom cladding for the FEOM structure is shown by the family of curves in FIG. 15. From the curves we see that the main effect of the dielectric constant of the bottom cladding material $\epsilon_{bcl}$ is that it can significantly change the effective propagating dielectric constant $\epsilon_{RF}$ of the transmission line on top of it. When $\epsilon_{bcl}$ increases from 1 to 5, $\epsilon_{RF}$ increases from 2.2 to 3.12. In terms of transmission line effective refractive index $n_{RF}$, which is the square root of $\epsilon_{RF}$, it increases from 1.48 to 1.77. The RF loss coefficient $\alpha_{RF}$ and transmission line characteristic impedance $Z_0$ also change a small amount but the changes are not as significant as that of the transmission line effective dielectric constant $\epsilon_{RF}$. Hence, tuning the substrate dielectric constant $\epsilon_{bcl}$ is a good way to tune $\epsilon_{RF}$, which is important for tuning the RF-Optical velocity matching.

Compared with the TC material, the substrate material and the EO material, the dimensions of the metallic electrodes are easier to engineer in order to achieve the final design goals.

Figure 16A:
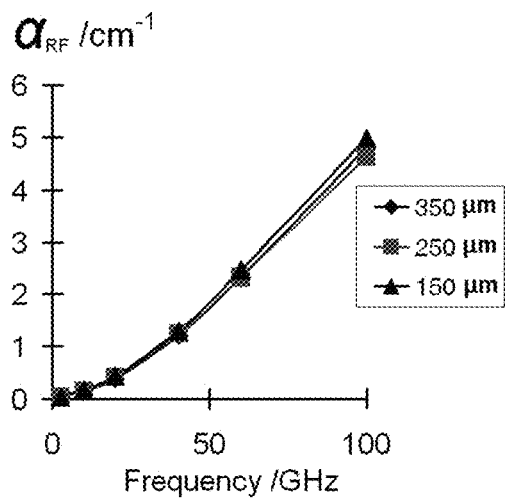
FIGS. 16A-C. Computational results for the FEOM modulator structure illustrating the width of the gold metallic electrode on: (A) RF loss coefficient; (B) transmission line effective dielectric constant $\in_{RF}$; (C) transmission line characteristic impedance $Z_0$. We assume the geometry of FIG. 10 with $d_{TC}=130$ nm, $\sigma_{TC}=10$ S/cm, $\sigma_{Metal}=\sigma_{Au}=4.1*10^5$ S/cm, $\in_{TC}=3$, $\in_{EO}=3$, $\in_{bcl}=2.5$, $\in_{scl}=3$, $W_{metal}=150$ µm, 250 µm, 350 µm, $d_{metal}=d_{cor}=1.5$ µm, $W_{gap}=1.6$ µm, $W_{cor}=1$ µm, $d_{bcl}=10$ µm FIGS. 17A-E. Computational results of the final TC based modulator structure: (A) RF loss coefficient; (B) Transmission line effective dielectric constant $\in_{RF}$ of the active region; (C) transmission line characteristic impedance $Z_o$ of the active region (D) The voltage drop from the metal transmission line to the EO waveguide core due to the RC cut-off effect (E) Full frequency response of the effective applied voltage. We assume $V_{appl}=1V$, L=5 mm, $\sigma_{TC}=5$ S/cm, 10 S/cm, 20 S/cm, $\sigma_{Metal}=\sigma_{Au}=4.1*10^5$ S/cm, $\in_{TC}=3$, $\in_{EO}=3$, $\in_{bcl}=2.5$, $\in_{scl}=3$, $W_{metal}=250$ µm, $d_{metal}=d_{cor}=1.5$ µm, $d_{TC}=130$ nm, $W_{gap}=1.6$ µm, $W_{cor}=1$ µm and $d_{bcl}=10$ µm FIGS. 18-19. High frequency structure designs for a TCO-based organic EO modulator. The structures comprise a pair of high speed metallic transmission lines and two $In_2O_3$ bridge electrodes conducting the voltage from the metallic transmission line to the EO optical waveguide core.
Figure 16B:
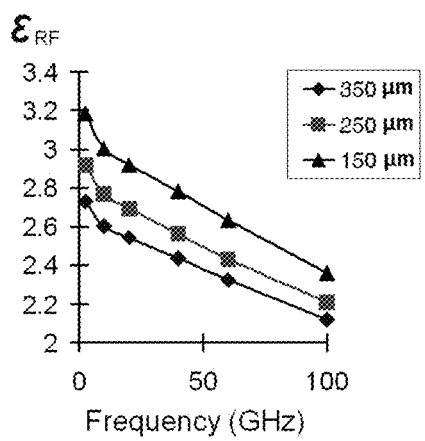
Figure 16C:
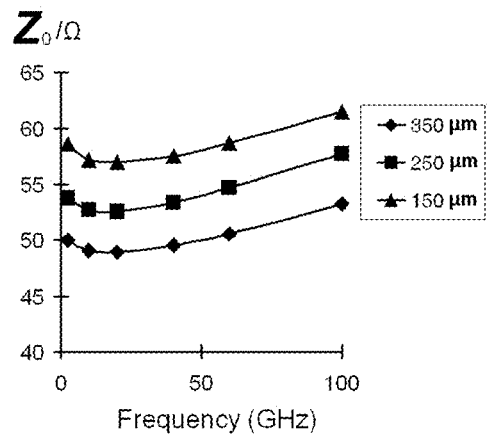

The effect of the width of the metallic electrodes $W_{metal}$ for the FEOM structure is shown by the family of curves in FIG. 16. From FIG. 16, we see that by adjusting the width of the metallic electrodes, the transmission line effective dielectric constant $\epsilon RF$ can be tuned towards matching the effective optical index $n_{opt}=1.6$ (which is obtained from the numerical simulation of the optical waveguide). Furthermore, the characteristic impedance can be tuned to be ~50Ω. At the same time, the RF voltage decay coefficient $\alpha_{RF}$ at 40 GHz is ~1.2/cm. Using FIG. 4, $\alpha_{RF}=1.2$/cm translates to a voltage drop coefficient $r_{RC}$ of 0.78.

Figure 17A:
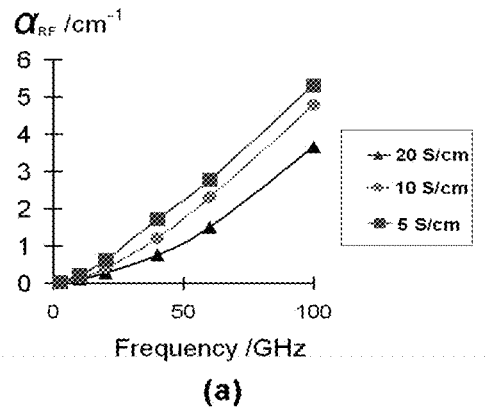
Figure 17B:
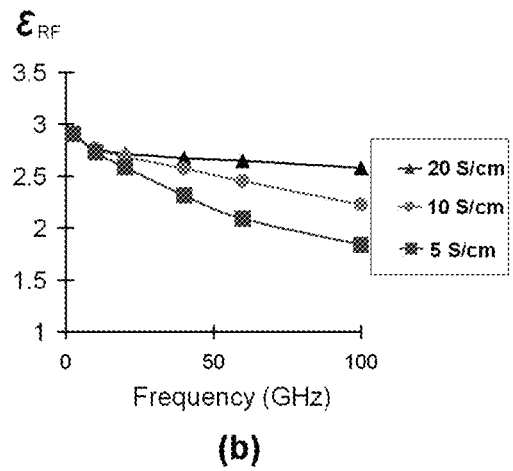
Figure 17C:
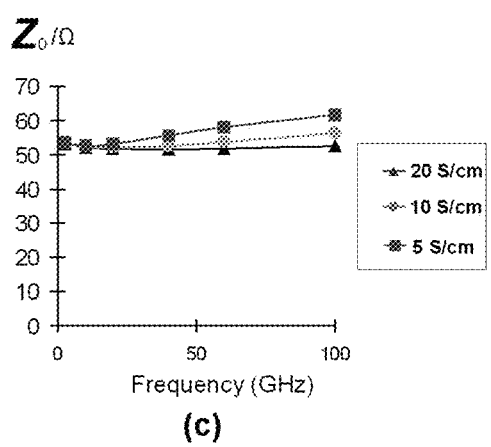
Figure 17D:
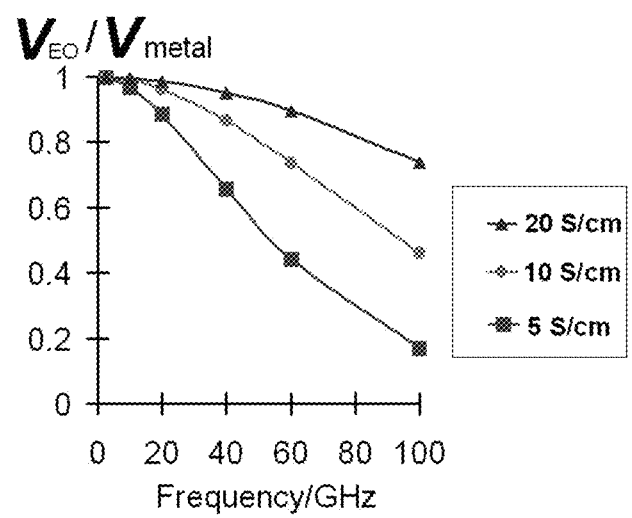
Figure 17E:
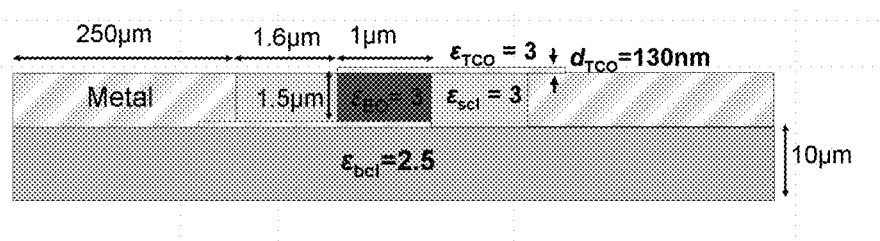
Figure 17E:
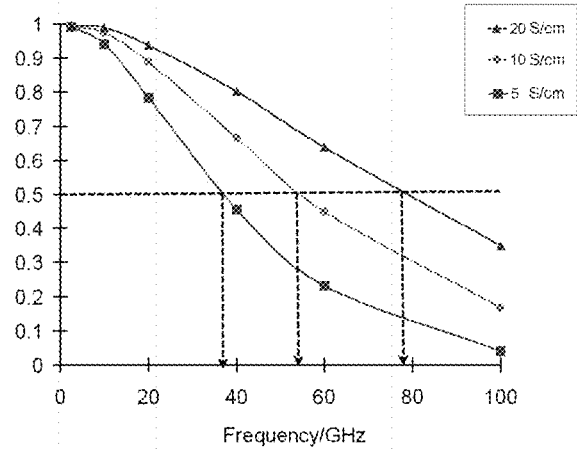

FIGS. 17A-D show RF loss coefficient $\alpha_{RF}$, transmission line effective dielectric constant $\epsilon_{RF}$, transmission line characteristic impedance $Z_o$ of a specific structure versus frequency, and the voltage drop coefficient $V_{eo}/V_{metal}$, respectively. From the curves we can see that the RF loss increases with frequency and lower TC conductivity leads to a higher RF loss, which is expected. The effective RF dielectric constant is tuned to the square of effective optical index ($1.6^2=2.56$). The characteristic impedance is designed to be 50Ω. FIG. 17E shows the overall frequency response taking into consideration of the effects shown in A-D. Note that when the TC conductivity $\sigma_{TC}$ is about 10 S/cm and the RF source voltage $V_{appl}=1$ V, the effective voltage $V_{eff}$ (which is the overall effective switching voltage on the EO layer) drops to ~0.5 V at 56 GHz. This means that the final effective modulator bandwidth is above 40 GHz for this particular case. Thus, this detailed numerical simulation gives the bandwidth of the EO modulator.

From the previous discussion of the relationship between $V_\pi L$ and r, it can be seen that if the material electro-optic coefficient is above 30 pm/V, a 1 cm long TC-based EO modulator with push-pull MZI configuration only requires a half-wave voltage $V_\pi 2=1$ V. Therefore we can see that, the TC-based structure can help the organic EO modulator to achieve ultra-low voltage (sub 1 V), ultra compact size (sub 1 cm), and a broad bandwidth (40 GHz).

With consideration of the preceding, this invention can provide a 100-fold reduction in switching power through use of: (1) a new, more easily fabricated $In_2O_3$(TCO)-based design with better organic compatibility, (2) a high-response organic EO material (e.g., AJCKL1) with larger $r_{33}$ and greater thermal stability, and (3) a complete high frequency modulator design analysis. The results show that a ~100-fold reduction in switching power (10× reduction in $V_\pi$) over that required by conventional organic EO modulator structures and high speed operation is possible. Device structures combining currently available organic EO materials (e.g., r33=100 pm/V-200 pm/V) and TCO electrodes offer modulators having $V_\pi=0.1$-0.5V, very high operation frequencies (40-100 GHz), and compact dimensions. Such devices are useful for RF photonics applications, with the compact sizes compatible with on-chip integration with semiconductor lasers.

Figure 18:
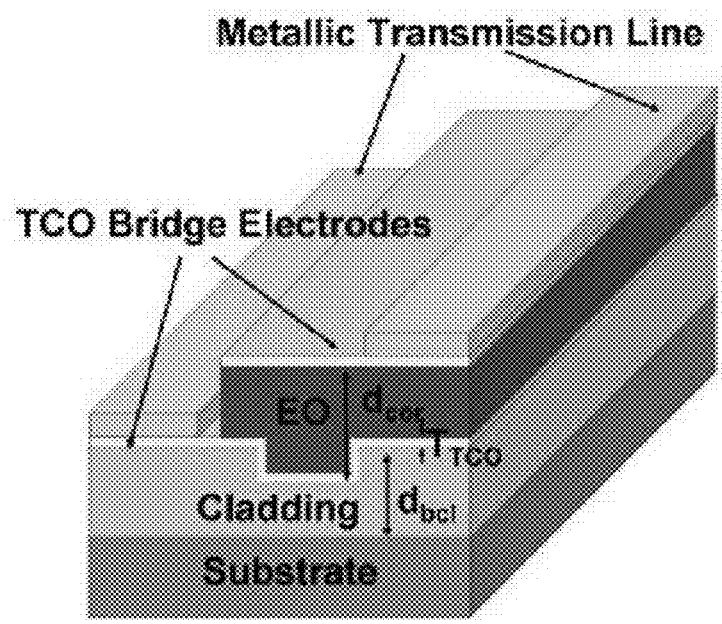

Referring to FIG. 18, a representative modulator was prepared, as described below. Two thin TCO layers conduct the voltage from metal side electrodes to the top and bottom parts of the EO waveguide core, thereby reducing $d_{el\text{-}Sep}$ from $d_{el\ sep}=d_{cor}+d_{tcl}+d_{bcl}$ to $d_{el\text{-}sep}=d_{cor}$. Table 4 below compares the voltage-size figure-of-merit enhancement provided by this electrode geometry. A 1 cm-long device with a conventional push-pull metal electrode design requires an EO material having a large $r_{33}=400$ pm/V to achieve $V_\pi=0.5$V. However, if the EO layer is directly modulated by transparent electrodes as in FIG. 19, the $r_{33}$ required for $V_\pi=0.5$V is only 50 pm/V. Furthermore, for sub-milliwatt operation (e.g., 200 μW for a 1 cm active length push-pull design), a conventional modulator structure requires an EO material having a currently unattainable $r_{33}=2000$ pm/V, while the TCO-based modulator requires only $r_{33}=250$ pm/V, which is currently possible.

TABLE 4

Projected enhancement of EO modulator power-size figure-of-merit using a TCO-based device structure versus a conventional structure. A TCO-based structure can enhance an organic EO modulator power-size figure-of-merit by 10x-100x versus a conventional device structure using the same EO material.

| $V_\pi$ (Assuming 1 cm active length with Push-Pull design) | Required Power ($P_{RF}=V^2/50\ \Omega$) | Required $r_{33}$ with Metal Electrodes ($d_{el\text{-}sep}$ = 12 μm) | Required $r_{33}$ with Transparent Electrodes ($d_{el\text{-}sep}$ = 1.5 μm) |
| --- | --- | --- | --- |
| 5 V | 500 mW | 40 pm/V | 5 pm/V |
| 1 V | 200 mW | 200 pm/V | 25 pm/V |
| 0.5 V | 5 mW | 400 pm/V | 50 pm/V |
| 0.25 V | 1.25 mW | 800 pm/V | 100 pm/V |
| 0.1 V | 200 pW | 2000 pm/V | 250 pm/V |

Regarding TCO electrode composition, materials such as tin-doped indium oxide (ITO) are used widely in flat panel displays. As discussed above, while ITO is excellent for visible wavelength applications, it is not suitable for the 1550 nm fiber-optic telecommunication wavelength due to the high IR optical absorption. Since the modulators of interest are intended to operate at 1550 nm, TCOs with low optical absorption in this region are essential. For such applications, TCOs such as undoped $In_2O_3$, ZnO, or CdO are more suitable due to their low optical absorption at 1300-1550 nm, as given by the loss coefficient $\sigma_{TCO}$. Besides the low loss requirement, an electrode TCO material must have a sufficiently high electrical conductivity, $\sigma_{TCO}$, to drive the modulator at high speed. Again, as discussed above, while doping TCO materials with additional carriers increases their conductivity $\sigma_{TCO}$, it also increases free carrier absorption at longer wavelengths, increasing $\sigma_{TCO}$. The electrical conductivity to optical absorption coefficient ratio, $F_{TCO}=\sigma_{TCO}/\alpha_{TCO}$, is an intrinsic materials property at a given wavelength and an important TCO modulator figure-of-merit. To achieve GHz frequency response and low operating voltage, $F_{TCO}$ should be >0.1 S, which requires precise tuning of TCO film growth conditions. Table 5 summarizes experimental $F_{TCO}$ values for TCO electrode films grown in this study. For the modulator reported here, we use $In_2O_3$, grown by Ion-Assisted Deposition (IAD) at room temperature and having a $F_{TCO}$>0.1 S.

TABLE 5

TCO electrode figure-of-merit data achieved in this work.

| TCO Material | Deposition Method | $\sigma_{TCO}$ | $\alpha_{TCO}$ | F = $\sigma_{TCO}/\alpha_{TCO}$ |
| --- | --- | --- | --- | --- |
| $In_2O_3$ | Ion-Assisted Deposition (IAD) | 300 S cm$^{-1}$ | 2000 cm$^{-1}$ | 0.15 S |
|  |  | 70 S cm$^{-1}$ | 800 cm$^{-1}$ | 0.13 S |
| ZnO | Ion-Assisted Deposition (IAD) | 5 S cm$^{-1}$ | 100 cm$^{-1}$ | 0.05 S |
| ZnO | Metal-Organic Chemical Vapor Deposition (MOCVD) | 54 S cm$^{-1}$ | 20 cm$^{-1}$ | 2.7 S |

Figure 19:
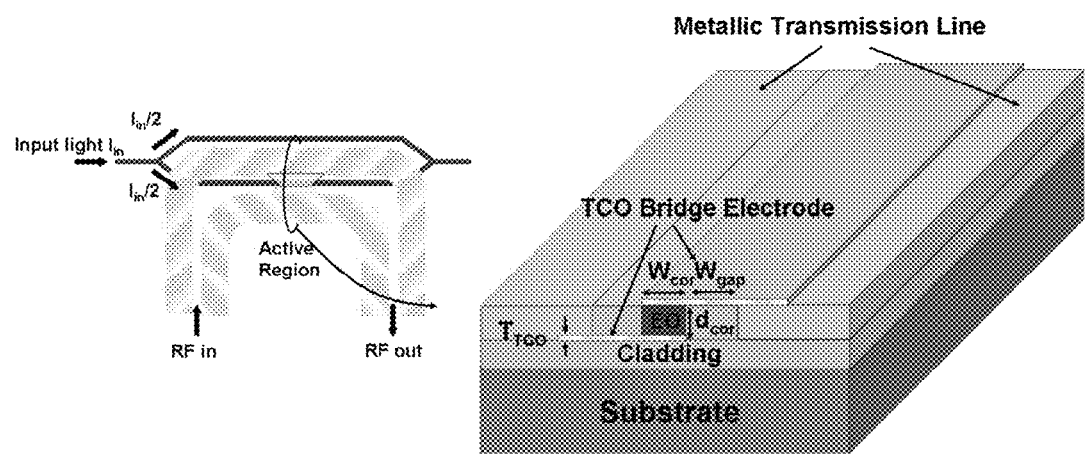

To achieve high frequency response, a variant of the traveling-wave structure shown in FIG. 18 was designed. With reference to FIG. 19, two parallel metallic plates to the left and right of the EO waveguide core form a high-frequency RF transmission line. In the active region, the TCO material forms "bridge electrodes" to transmit the voltage laterally from the metallic transmission line to the active EO material region. We have performed detailed high-frequency analysis of such structures and find that with appropriate choice of TCO bridge electrode length and materials properties, it is possible to achieve the low RF propagation losses and good RF-optical velocity matching required for high-frequency operation. Our simulation shows that a 50Ω transmission line impedance and high EO frequency response of 40-100 GHz can be achieved using the traveling-wave structure shown.

In Table 6, we compare the $V_\pi L$ product of the present TCO-based modulator structure with those of recently reported high-performance modulators having metal electrode structures and the necessary cladding layers. A conventional device structure with an earlier generation organic EO material (known in the art as AJLS8) yields a $V_\pi L$ product of 3.2V-cm. A higher $r_{33}$ EO material (known in the art as AJ309) with $r_{33}$=220 pm/V under direct poling and with an estimated $r_{33}$=138 pm/V inside the fabricated device, yields an impressive $V_\pi L$ of 2.4V-cm. In conventional structures, in-device poled $r_{33}$ values are typically ~½ the maximum achievable $r_{33}$ due to the presence of the waveguide cladding layers which reduce poling efficiency. In the present discussion, the formal $r_{33}$ will be called the direct-poled $r_{33}$ and the latter $r_{33}$, the in-device $r_{33}$. (See, e.g., the authorities listed in Table 6, each of which is incorporated herein by reference in its entirety.)

Figure 20C:
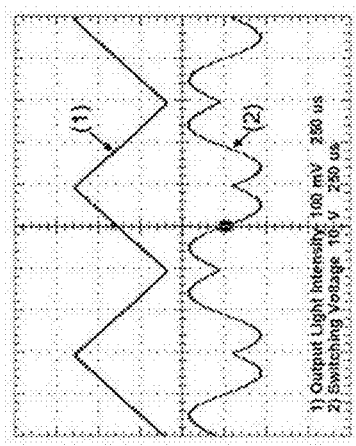
FIGS. 20A-C. (A) Inverted rib waveguide structure used for the present demonstration of a TCO-based organic EO modulator; (B) SEM cross-section image of the fabricated device; and (C) Measured waveforms of the switching voltage and the detected output light intensity. The measurement was made at $\lambda=1.3$ µm, and the driving voltage frequency was 1 kHz.
Figure 20B:
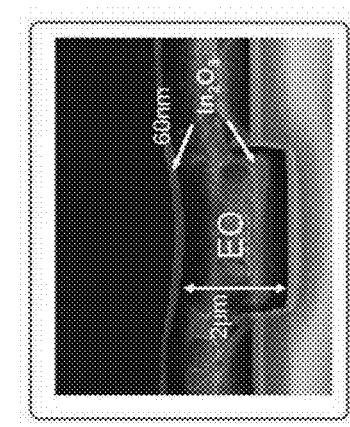
Figure 20A:
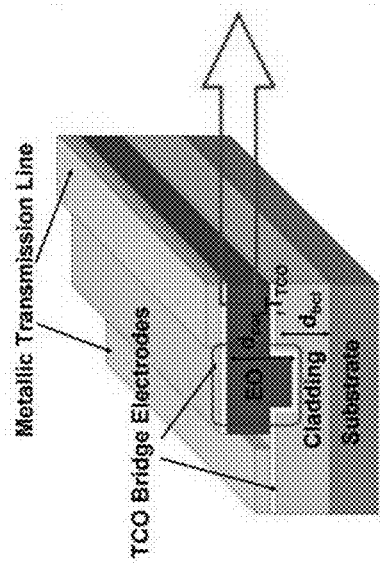

To demonstrate the low $V_\pi L$ potential of TCO-based organic EO modulators, a proof-of-concept device was fabricated. As noted above, we used the known EO material AJ-CKL1 with a larger EO response and better thermal stability than material previously utilized. A schematic and SEM cross-section image of a straight-channel phase modulator are shown in FIGS. 20A-B. The new device structure in FIG. 20A has far better compatibility with the EO material, by comparison with device structures of the prior art. Optical mode confinement in horizontal direction is realized with an inverted rib waveguide structure, formed by pre-etching a trench in the bottom cladding layer (SiO$_2$) before spin-coating and poling the EO polymer layer. Deposition of the top TCO electrode (In$_2$O$_3$) can now be carried out at room temperature which avoids undesirable thermal exposure in the post-poling process—e.g., the fabrication of top cladding layer by simple photolithography and RIE etching. FIG. 20B shows the waveforms of the applied switching voltage at KHz and the intensity of the modulated light beam. For a number of devices fabricated, the voltage-size figure-of-merit obtained ranged from 0.6V-cm to 0.9V-cm, after physically reasonable conversion of the directly measured $V_\pi L$ to that for a push-pull geometry. The present 0.6V-cm voltage-size figure-of-merit corresponds to a very low power-size figure-of-merit of 7.2 mW-cm$^2$—very close to the desired 5 mW driving power in a 1.0 cm long device.

Figure 21:
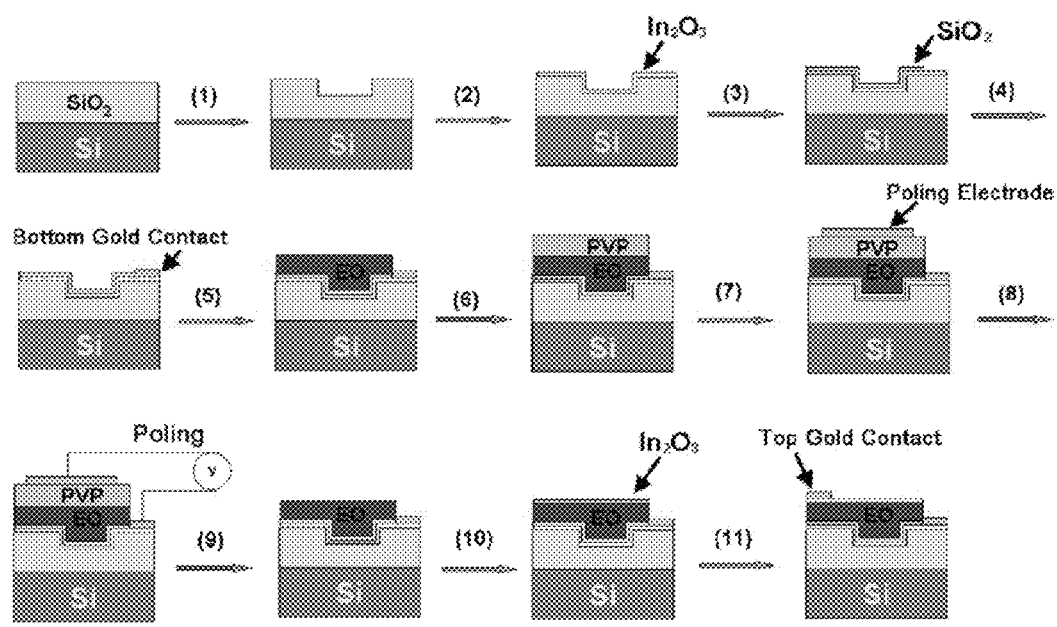
FIG. 21. Fabrication process for the side conduction TCO-based EO modulator of FIG. 20.

A TCO Modulator was prepared as schematically illustrated in FIG. 21. After fabrication of the bottom ridge structure on a 3 μm thick SiO$_2$ layer on Si by standard photolithography (step 1), a 60 nm In$_2$O$_3$ TCO layer is grown by Ion-Assisted Deposition (IAD) at room temperature to form the bottom TCO bridge electrode (step 2). (See, e.g., Freeman, A. J.; Poeppelmeier, K. R.; Mason, T. O.;

TABLE 6

Comparison of voltage-size figures-of-merit for organic EO modulators having metal electrode device structures with the TCO-based structure reported here. To compare the results for modulators having different geometries, all the voltage-size figures-of-merit are converted to a push-pull geometry.

| Year | Voltage-Size Figure-of-Merit (in-device $r_{33}$) | Driving Power (1.0 cm device length) | EO Material (direct-poled $r_{33}$) | Structure | Reference |
|---|---|---|---|---|---|
| 2009 | 0.6 V-cm (60 pm/V) | 7.2 mW | AJ-CKL1 (AJY02/APC) (120 pm/V) | Straight waveguide | This Invention |
| 2007 | 2.4 V-cm (138 pm/V) | 115 mW | AJ309 (AJ146/BMI/P1VIMA) (220 pm/V) | Push-Pull | Y. Enami et aL Nature Photonics (2007) |
| 2006 | 3.2 V-cm (52 pm/V) | 352 mW | AJLS8 (AJLS102/APC) (120 pm/V) | Push-Pull | R. Dinu et aL SPIE Proc. (2006) |

Using such a TCO-based modulator, a $V_\pi L$ as low as 0.6V-cm was realized. This is ~4× smaller than that of the above 2.4V-cm value, and the 4× lower $V_\pi L$ product means a 16× reduction in required modulator driving power. The new In$_2$O$_3$ device reported here uses the organic EO material AJ-CKL1 having an in-device $r_{33}$=60 pm/V (half the maximum direct-poled value of $r_{33}$=120 pm/V). Future improved poling procedures should reasonably yield another factor of 2× reduction in $V_\pi L$. The refractive indices of this polymer in the unpoled state were measured with a Metricon 2010 prism coupler to be λ=1.693 (TE) and λ=1.680 (TM) at 2=1300 nm, and n=1.661 (TE) and n=1.642 (TM) at λ=1550 nm.

Chang, R. P. H.; Marks, T. J. Chemical and Thin Film Strategies for new Transparent Conducting Oxides, Mats. Res. Soc. Bull. 25, 45-51. (2000); and Wang, L.; Yoon, M.-H.; Lu, G.; Facchetti, A.; Yang, Y.; Marks, T. J. High-Performance Transparent Inorganic-Organic Hybrid Thin-Film Transistors Fabricated at Room Temperature. Towards Large-Scale Invisible Electronics, Nature Mater., 5, 893-900 (2006), each of which is incorporated herein by reference in its entirety.) A 90 nm SiO$_2$ layer is then grown on top of the TCO layer as protective layer to reduce EO polymer breakdown during electric field poling (step 3). A 150 μm gold layer is then thermally evaporated/patterned by shadow masking on the side of the bottom TCO bridge electrode to act as the bottom contact (step 4). Next, a 1.5 μm EO polymer layer is spin-coated onto the substrate (step 5). The AJ-CKL1 EO polymer, available through synthetic art techniques described in the literature and known in the art as a material providing a high EO coefficient, is formulated by doping 30 wt % of the known chromophore AJY02 into a low-loss, high-$T_g$ amorphous polycarbonate (APC) host. (See, e.g., Cheng, Y.-J.; Luo, J.; Huang, S.; Zhou, X.; Shi, Z.; Kim, T.-D.; Bale, D. H.; Takahashi, S.; Yick, A.; Polishak, B. M.; Jang, S.-H.; Dalton, L. R.; Reid, P. J.; Steier, W. H.; and Jen, A. K.-Y. Donor-Acceptor Thiolated Polyenic Chromophores Exhibiting Large Optical Nonlinearity and Excellent Photostability. *Chem. Mater.,* 20, 5047-5054 (2008), incorporated herein by reference in its entirety.) Thus, 32.0 mg of APC and 13.7 mg of AJY02 is dissolved in 770 mg of dibromomethane, and this mixture is shaken for 3 h to obtain a homogeneous solution. This solution is then filtered through a 0.2 μm pore size PTFE filter and spin-coated onto the device substrate, followed by drying under vacuum at 80° C. for 0.5 h. The film thickness is adjusted to ~1.5-1.8 μm using a 1100-1600 rpm spinning speed. Under these processing conditions, the EO polymer fills the trench and forms the desired inverted rib optical waveguide structure. Next, a solution of 20 wt % poly(4-vinylphenol) (PVP) in n-propanol is spin-coated on the top of the EO layer to deposit a 1.5 μm PVP film (step 6). The PVP/EO bilayer is then thoroughly dried under vacuum at 80° C. This PVP layer is used as a sacrificial buffer for poling, to produce poled EO films with acceptable surface quality. After PVP layer deposition and drying, a 100 nm gold poling electrode is thermally evaporated onto the PVP layer (step 7). EO film electric-field poling is performed by first applying 250V-300V to provide a ~100 V/m poling field. The film temperature is then ramped from 60° C. to 135° C. at a rate of 10° C./min. The poling current increases from 6.0 μA to 150 μA during this period. Once the maximum temperature is reached, the sample is slowly cooled to room temperature before terminating the voltage (step 8). The gold poling electrode is next removed by wet etching and the PVP protective layer removed with ethanol (step 9). A 60 nm $In_2O_3$ TCO layer is then grown by IAD at room temperature on top of the poled EO film to form the top TCO bridge electrode (step 10). Finally, a 150 nm gold layer is thermally evaporated/patterned on top of the TCO bridge electrode to form the top metal contact (step 11).

The EO phase shift is measured by converting the phase modulation to intensity modulation using a cross-polarization interference setup: input light from a 5 mW 1310 nm semiconductor laser is linearly polarized at +45° to the direction of the switching voltage. The light is coupled into the straight waveguide using a 60× objective lens with a numerical aperture of 0.6. The output light from the waveguide is collected by another 60× objective lens and passed through a polarization analyzer oriented with an analyzed polarization at ~450 to the direction of the switching voltage. Phase modulation is converted to intensity modulation after the analyzer. The intensity modulation is detected by a photo-detector and recorded with an oscilloscope.

The preceding embodiments, examples and data illustrate various aspects and features relating to modulator devices and components of the present invention, including the assembly of several representative device structures comprising TCO electrode bridge components, as described herein. In comparison with the prior art, the present device and component structures provide results and data which are surprising, unexpected and contrary thereto. While the utility of this invention is illustrated through the use of several side-conduction modulator structures, waveguide, core and electrode bridge components thereof, and corresponding EO and TCO materials which can be used, respectively, therewith, it will be understood by those skilled in the art that comparable results are obtainable with various other such modulator structures, waveguide, core and/or electrode bridge components thereof, and various other respective EO and TCO materials, consistent with the mathematical and functional relationships described herein, as are commensurate with the scope of this invention.

For example, without limitation, the modulator and related device structures of this invention can incorporate a core component selected from a range of available organic EO materials of the sort recognized in the art as having high EO coefficients (e.g., ~≥5× lithium niobate), such materials as are discussed herein, described in one or more of the incorporated references or, whether currently available or developed hereafter, known to one skilled in art made aware of this invention.

Likewise, TCO component materials can be chosen from a range of available materials having the conductivity and absorption coefficients providing the applied voltage and bandwidth parameters desired for modulator performance. Such properties and physical characteristics of transparent conducting and transparent conducting oxide materials are known in the art or can be readily determined using known experimental techniques. For instance, various TCO materials of the type useful in context of the present invention (e.g., various indium, zinc and cadmium, etc., oxide materials) can be prepared, isolated and/or characterized, then utilized, as described in co-pending application Ser. No. 11/888,502 filed Aug. 1, 2007, together with the technical publications cited therein, such application incorporated herein by reference in its entirety. Conversely, given the conductivity and absorption coefficients for a known TCO electrode bridge material, a modulator device of the type described herein can be designed and constructed, in conjunction with a particular EO material, to target a desired switching voltage, modulation frequency and/or bandwidth. Regardless of any particular EO material, useful TCO materials will be understood by those skilled in the art in the context of the EO modulator devices and related signal transmission systems of this invention.

We claim:

1. A system for transmitting RF signals, said system comprising:
    an electro-optic modulator for side conduction of voltage, said
    modulator comprising an optical waveguide component comprising an organic core component and a cladding component below said core component and optically coupled to said core component, said core component connected to opposed metallic electrode components, each said connection with a laterally-extending transparent conducting oxide electrode bridge component, said cladding consisting of bottom and lateral components said bottom cladding component configured to provide a recess and said lateral components, said core component positioned in said recess between said lateral components and each said opposed metallic electrode laterally disposed from said recess, said waveguide component providing optical mode confinement in the horizontal direction; and a switching voltage applied across said core component with said laterally-extending transparent conducting oxide bridge components.

2. The system of claim 1 wherein said transparent conducting oxide electrode bridge component has an electro-optic coefficient greater than about 25 pm/V.

3. The system of claim 2 wherein said transparent conducting oxide electrode bridge component has an electro-optic coefficient from about 50-about 250 pm/V.

4. The system of claim 3 wherein said opposed metallic electrode components are separated by a distance less than about 2 rm.

5. The system of claim 4 wherein said modulator operates with a switching voltage less than about 1V and a frequency greater than about 40 GHz.

6. The system of claim 1 wherein said opposed metallic electrodes are in an RF transmission line.

7. A system for transmitting RF signals, said system comprising:

an electro-optic modulator for side conduction of voltage, said modulator comprising an optical waveguide component comprising an organic core component and a cladding component below said core component and optically coupled to said core component, said, said core component connected to opposed metallic electrode components, each said connection with a laterally-extending transparent conducting oxide electrode bridge component, said cladding consisting of bottom and lateral components said bottom cladding component configured to provide a recess and said lateral components, said core component positioned in said recess between said lateral components and each said opposed metallic electrode laterally disposed from said recess, said waveguide component providing optical mode confinement in the horizontal direction; and a switching voltage applied across said core component with said laterally-extending transparent conducting oxide bridge components, wherein said modulator operates with a switching voltage less that about 1V and a frequency greater than about 40 GHz.

8. The system of claim 7 wherein said transparent conducting oxide electrode bridge component has an electro-optic coefficient greater than about 25 pm/V.

9. The system of claim 8 wherein said transparent conducting oxide electrode bridge component has an electro-optic coefficient from about 50-about 250 pm/V.

10. The system of claim 9 wherein said opposed metallic electrode components are separated by a distance less than about 2 rm.

11. The system of claim 7 wherein said opposed metallic electrodes are in an RF transmission line.

* * * * *

UNITED STATES PATENT AND TRADEMARK OFFICE
CERTIFICATE OF CORRECTION

PATENT NO. : 9,568,752 B2
APPLICATION NO. : 15/018361
DATED : February 14, 2017
INVENTOR(S) : Ho et al.

Page 1 of 1

It is certified that error appears in the above-identified patent and that said Letters Patent is hereby corrected as shown below:

In the Claims
Column 27, Lines 7-9:
Delete "The system of claim 3 wherein said opposed metallic electrode components are separated by a distance less than about 2 rm" and insert --The system of claim 3 wherein said opposed metallic electrode components are separated by a distance less than about 2 µm--

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*